United States Patent

[11] 3,602,895

[72] Inventor Edward Loizides
Poughkeepsie, N.Y.
[21] Appl. No. 837,526
[22] Filed June 30, 1969
[45] Patented Aug. 31, 1971
[73] Assignee International Business Machines Corporation
Armonk, N.Y.

[54] ONE KEY BYTE PER KEY INDEXING METHOD AND MEANS
66 Claims, 30 Drawing Figs.

[52] U.S. Cl. ........ 340/172.5
[51] Int. Cl. ........ G06f 7/00, G06f 15/40
[50] Field of Search ........ 340/172.5

[56] References Cited
UNITED STATES PATENTS
3,242,470 3/1966 Hagelbarger et al. ........ 340/172.5
3,344,406 9/1967 Vinal ........ 340/172.5

*Primary Examiner*—Raulfe B. Zache
*Attorneys*—Hanifin and Jancin and Bernard M. Goldman

ABSTRACT: Electronically controlled method and means for a compressed index in which each key has only a single key byte and a position control field. Each compressed key represents a corresponding uncompressed key of any byte length by means of a pointer associated with the corresponding uncompressed key in the source uncompressed index from which the compressed index is derived. The search reads out the pointer with any specially-selected compressed key having an equal condition between its key byte and a current search-argument byte. After ending conditions are established, the last readout pointer is correct if the search argument is in the source uncompressed index.

UNCOMPRESSED INDEX

COMPRESSED INDEX

INVENTOR
EDWARD LOIZIDES

BY Bernard M. Goldman
ATTORNEY

GENERATE CLOCK CONTROL - 2

( GENERATE )

CLOCK CONTROL CYCLES

SINGLE PK SEARCH

ONE KEY BYTE PER KEY INDEXING METHOD AND MEANS

TABLE OF CONTENTS

| | Column |
|---|---|
| Abstract of Disclosure | Front Page |
| Background of the Invention | 1 |
| Definition Table | 2 |
| Symbol Table | 5 |
| The Invention | 5 |
| Generate mode distinctions | 6 |
| Search mode distinctions | 6 |
| Generate Mode—General | 8 |
| Table A | 10 |
| Table B | 11 |
| Table C | 11 |
| Table D | 11 |
| Table E (Same-order relationship table) | 13 |
| Generate Mode Method and System Embodiments | 13 |
| Search Mode Method and System Embodiments | 19 |
| State Table | 21 |
| Search Method Summary | 21 |
| I. Prerequisite | 21 |
| II. State–1 | 21 |
| III. State–2 | 21 |
| IV. State–3 | 22 |
| V. State–4 | 22 |
| VI. Ending condition | 22 |
| VIII. Additional optional ending conditions | 22 |
| Summary Table | 23 |
| Searching Descending Indexes | 27 |
| Equal Counter Option | 28 |
| Search Example | 28 |

BACKGROUND OF THE INVENTION

This invention relates generally to information retrieval and particularly to improvements in new electronically controlled techniques for generating and searching machine-readable indexes. Basic methods and means for machine-generating and machine-searching of compressed indexes on a single level are disclosed and claimed in U.S. Pat. applications Ser. Nos. 788,807, 788,835 and 788,876 filed on Jan. 3, 1969 and owned by the same assignee as the subject application.

Method and means for generating and searching one level and multilevel indexes are respectively disclosed and claimed in U.S. Pat. applications Ser. Nos. 836,930 and 836,825, filed on June 26, 1969 and also assigned to the same assignee as the subject invention.

Within the information retrieval environment, the invention relates to a tool useful in locating information indexed by keys. Any type of alphanumeric keys arranged in sorted sequence can be converted into compressed-key form and searched by the subject invention. Each compressed key represents an uncompressed key such as by having the same data locator or pointer associated with it. The location of the represented data is directly or indirectly provided by the attached pointer, or it may be derivable from the key itself by means not part of this invention. Each compressed key also may have associated with it one or more items of information it represents.

The subject invention is inclusive of a new and inventive algorithm which greatly improves the speed of searching a sorted index by searching a compressed form of the index rather than by searching the uncompressed index.

Many different methods and means for searching an uncompressed sorted index are known and have been disclosed in the past. Uncompressed index searching is being electronically performed with computer systems, using special access methods, control means, and electronic cataloging techniques. U.S. Pat. Nos. 3,408,631 to J.R. Evans; 3,315,233 to R. De Camp et al.; 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed key format results in having to scan a large number of bytes in every key entry while looking for a search argument. This is time consuming and costly when searching a large index or when repeatedly searching a small index. It is this area which is attacked by the subject invention, which greatly reduces the number of scanned bytes per key entry in a searched index. A result obtained is smaller search-storage requirements and faster searching due to less bytes needing to be machine-sensed. A significant increase in searching speed results without changing the speed of a computer system.

Current electronic computer search techniques, such as in the above cited patents, have uncompressed keys accompanying records on a disc or drum for indexing the subject matter contained in an associated record. A search for the associated record may be done either by the key or by the address of the record. For example, in U.S. Pat. Nos. 3,408,631; 3,350,693; 3,343,134; 3,344,402; 3,344,403 and 3,344,405 an uncompressed key can be indexed on a magnetically recorded disc. A key can be electronically scanned by a search argument for a compare-equal condition. Upon having a compare-equal condition, a pointer address associated with the respective uncompressed key is obtained and used to retrieve the record represented by the key which may be elsewhere on the disc. This pointer, for example, may include the location on the disc device, or on another device, where the record is recorded. The computer system can thereby automatically access the addressed record. After being located, the record may be used for any required purpose.

Commonly used terms in this specification have their definitions consolidated in the following DEFINITION TABLE. A SYMBOL TABLE follows to consolidate commonly used symbols found in the specification. Many items in the SYMBOL TABLE are further defined in the DEFINITION TABLE.

DEFINITION TABLE

ARGUMENT BYTE

Any single byte in the search argument which is currently being searched for in the compressed index. It is generally designated by its acronym, i.e. A byte. The position of the current A byte in the search argument is represented by the current setting of the equal counter.

APEX LEVEL

The highest level in the index. It usually comprises only a single block.

BINARY SEARCH

A search in which a set of sorted items is divided into two parts, where one part is rejected, and the process is repeated on the accepted part until the item with the desired property is found. (The binary search is a well-known and widely used computer programming technique for finding an argument in a sorted table.)

BLOCK

A collection of recorded information which is machine-accessible as a unit. A block is also called a RECORD. The meaning of block and record ordinarily found in the computer arts is applicable.

BOUNDARY PAIR

A pair of uncompressed keys which include the last uncompressed key used in the generation of a low level compressed index block, and the first uncompressed key used in the generation of the next logically sequential low level compressed index block.

COMPRESSED BLOCK

An index block comprising compressed index entries. It is also called a COMPRESSED INDEX BLOCK. It is a LOW LEVEL COMPRESSED BLOCK if it is part of a low index level. It is a HIGH LEVEL COMPRESSED BLOCK if it is part of a high index level.

COMPRESSED INDEX

An index of keys which are compressed by the method described in prior application Ser. No. 788,807 or 788,876.

COMPRESSED INDEX ENTRY

An index entry having at least one compressed key and a related pointer. A HIGH-LEVEL INDEX ENTRY includes two compressed keys and a pointer. A LOW-LEVEL INDEX ENTRY includes one compressed key and a pointer.

COMPRESSED KEY

A reduced form of a key which in most situations contains a substantially smaller number of characters, or bits, than the original key it represents. It is generated by the method described in prior application Ser. No. 788,807 or 788,876. It is generally referenced by its acronym CK. A CK is sometimes referred to by its format, PK, in which P is the position byte and K is one or more key bytes.

COMPRESSED KEY FORMAT

The form of a compressed key. It may be generated by the method described in prior application Ser. No. 788,876, in which P is a position byte, and K is one or more keys bytes to provide the format, PK, for representing a CK. The LOW-LEVEL COMPRESSED ENTRY FORMAT is CK,R (equivalent to PK,R) in which R is a related pointer. The HIGH-LEVEL COMPRESSED ENTRY FORMAT is CK,CK,R (which is equivalent to PK,PK,R).

DATA BLOCK

Data grouped into a single machine-accessible entity. A data block is also called a DATA LEVEL BLOCK.

DATA LEVEL

The collection of data, which may be called a data base, which is retrievable through the index. The data level comprises one or more data blocks.

DUMMY UNCOMPRESSED KEY

A simulated uncompressed key which represents the first key that can exist in a sorted sequence of keys. It is the lowest possible key in an ascending sequence of keys, and the highest possible key in a descending sequence of keys. For example, the lowest possible key in an ascending sequence would have at least one null character when the EBCDIC character set is used, in which the null character comprises eight binary zeros, and it may be called a "NULL UK."

EQUAL COUNTER

A counter or register with a setting which indicates the current number of consecutive high-order bytes of the search argument found to be equal to K bytes during the search of a compressed index. The equal counter setting is initialized before searching an index block to indicate the highest-order byte position in the search argument. The equal counter is incremented each time the next consecutive current A byte is found to be equal to a selected K byte.

HIGH INDEX LEVEL

A grouping of index block's having entries with pointers that address index block's in a lower index level; that is, the pointers in a high level do not address data blocks. Every index level, except the lowest level, is a high index level.

HIGH LEVEL BLOCK

An index block in any high index level. Compressed or uncompressed keys may be included in the block.

INDEX

A recorded compilation of keys with associated pointers for locating information in a machine-readable file, data set, or data base. The keys and pointers are accessible to and readable by a computer system. The purpose of the index is to aid the retrieval of required data blocks containing the required information.

INDEX BLOCK

A sequence of index entries which are grouped into a single machine accessible entity.

INDEX ENTRY

An element of an index block having a single pointer. The entry may contain compressed or uncompressed key(s).

INDEX LEVEL

A set of entries in an index or compressed index which have pointers which address another level of the index.

KEY

A group of characters, or bits, forming one or more fields in a data block or item, utilized in the identification or location of the data block or item. The key may be part of the data, by which a data block, record, or file is identified, controlled or sorted. The ordinary meaning for key found in the computer arts is applicable.

KEY BYTE

A selected character in a compressed or uncompressed key. It is also called a K byte in a compressed key.

LEFT SHIFT CK

A compressed key in which the P byte within a CK has a smaller value than the P byte in the prior CK in the index.

LOWEST LEVEL

All index blocks which have entries with pointers that address data blocks. The lowest level is also called the LOW LEVEL. The "lowest level" or "low level" is to be distinguished from LOWER LEVEL which is a relative term that can apply to any index level except the highest level in an index.

MULTILEVEL INDEX

An index with a lowest level and one or more high levels.

NOISE BYTE

All bytes in an uncompressed key to the right of its byte at the P byte position, i.e. to the right of the leftmost difference byte. In other words, the noise bytes are all bytes at lower-order byte positions in an uncompressed key than its highest-order unequal byte position determined in a comparison with the prior uncompressed key in a sorted sequence. The acronym N is sometimes used to designate a noise byte.

NO SHIFT CK

A compressed key in which the P byte within a CK has the same value as the P byte in the prior CK in the index.

POINTER

An address with a compressed key entry which locates a related block which is in a next lower index level or in the data level.

POSITION BYTE

A control byte in a compressed key usually called a P byte. Its value relates the rightmost K byte in the compressed key to its derived position in an uncompressed key. The derived position is for the highest-order unequal byte in the uncompressed key determined in a comparison between it and the prior uncompressed key in sorted sequence.

RIGHT SHIFT CK

A compressed key in which the P byte within a CK has a greater value than the P byte in the prior CK in the index.

SEARCH ARGUMENT

A known reference word, or argument, which is a name or designator which may be assigned to a data block. The search argument is used to search for a desired data block in a data base. The desired data block is expected to have a key field identical to the search argument. The acronym SA is used to represent the search argument. Each byte of the search argument is called an A byte. For example, an employee's name may be an SA used in searching for his record in a company file indexed by employee names.

UNCOMPRESSED INDEX

An index as previously defined in which its key's are uncompressed key's.

UNCOMPRESSED KEY

It has the same meaning as the ordinary meaning for KEY understood in the data processing arts. (The reason for adding the descriptor "uncompressed" in this specification is to distinguish the ordinary key, which has an uncompressed form, from a reduced form, which is called herein by the term, compressed key.) It is generally referred to by its acronym UK.

SYMBOL TABLE

| | |
|---|---|
| A | Argument byte. |
| B | An equal byte in an uncompressed key. Each B byte compares equal with the correspondingly positioned byte in the prior uncompressed key in the sorted sequence. |
| CK | Compressed key. A subscript on CK particularizes it. |
| CK's | Plural for CK. |
| $CK_i$ | The current CK being examined while searching a sequence of CK's. |
| CK's | Plural for CK. |
| $i$ | A subscript on an item which particularized the item as being the current item being examined during the process. |
| $i-1$ | A subscript on an item which particularized the item as being the prior item examined during the processing sequence. |
| $i+1$ | A subscript on an item which particularizes the item as being the next item to be examined during the processing sequence. |
| K | Key byte. (A subscript on K further particularizes it.) There is only one K byte in each compressed key. It is derived from the leftmost byte in an uncompressed key which compares unequal with the correspondingly positioned byte in the prior uncompressed key in the sorted sequence. This byte is also called the "highest-order unequal byte," or the "difference byte." Byte position significance is presumed to decrease within a UK in going from left to right as ordinarily understood for sorting purposes. The K byte for the UK becomes the K byte in a CK. |
| $K_i$ | The acronym K with the subscript $i$. It means the key byte currently being examined while searching a sequence of compressed keys. |
| N | A noise byte in an uncompressed key. It is each byte in an uncompressed key to the right of its K byte (i.e. at a less significant byte position). (Noise bytes are not needed for compressed index construction or searching). |
| P | Position byte. (A subscript on P further particularizes it). |
| $P_E$ | A bit indication stored during the search process to later indicate that a compressed key was found with its K byte equal to the compared A byte, and that the pointer with that CK was stored. |
| $P_H$ | A P byte value stored during the search process from a compressed key which has its K byte found to be greater than the compared A byte. ($P_H$ is used in searching an ascending index). |
| $P_L$ | A P byte value stored during the search process from a compressed key which has its K byte found to be less than the compared A byte. ($P_L$ is used instead of $P_H$ in searching a descending index). |
| $P_i$ | The P byte currently being examined during the process of searching a sequence of compressed keys. |
| $P_{i-1}$ | The P byte examined prior to $P_i$. |
| PK | A format for a compressed key in which there is a P byte and a K byte. (A subscript on PK further particularizes it.) |
| R | Pointer. It comprises one or more bytes representing an address of a block related to the compressed key with which the pointer is associated. |
| UK | Uncompressed key. (A subscript on UK further particularizes it.) |
| UK's | Plural for UK. |

THE INVENTION

This invention pertains to generating and searching a compressed form of a sorted index. The compressed form in the subject invention retains only a single byte of the original uncompressed key regardless of the number of bytes in the uncompressed key. For example, 34 bytes (characters) comprise the key field (name and address) in a single line of the City of Poughkeepsie telephone directory; it is essential to include the address within the key in order to distinguish among identical names. This invention would use only a single character of the 34 to represent that name and address; and it would be associated with the same telephone number to comprise the directory. This invention can reduce the byte size of this directory to less than 25 percent of its current size, and yet include all telephone numbers in their present uncompressed seven-byte format.

The most pertinent known prior art is found in the previously cited U.S. Pat. application Ser. No. 788,876 filed by the same assignee as the subject-application. The subject specification contains the following basic differences from that and other applications:

A. Generate mode distinctions:

1. A single key byte per compressed key (CK) is generated by this invention. (The prior-cited applications generated a variable number of key bytes per CK).
2. A single control field per CK fully defines the location of its key byte field in this invention. (Prior-cited application No. 788,876 used both the prior CK control field and the current CK control field, while prior application No. 788,835 used a dual control field, i.e. factor byte number F and key byte number L, to fully locate the k byte field.)
3. Each CK is associated with the second UK's pointer of its generation pair of UK's, due to an equal-condition readout during searching. (The prior cited applications associated each CK with the first UK's pointer of its generation pair of UK's, due to a high-condition readout during searching.)
4. The size of the one-key byte compressed index is not dependent on the "tightness" of the uncompressed index, i.e. the variation in the sorted relationship of the uncompressed index. (The prior-cited applications provided a compressed index which are size dependent on the "-tightness" of the source uncompressed index.)

B. Search mode distinctions:

1. Every byte of the search argument (S.A.) must be accessible during a search of single key-byte CK index, even though only one S.A. byte is used at one time. (In the prior-cited applications, only a single sequentially-provided byte of the S.A. needed to be accessible at any one time.)
2. The S.A. byte sequence used during a search is determined by the sequence of the P values in the single key-byte compressed index. (In the prior-cited applications, S.A. bytes were examined in the sequence found in their S.A. from high-to-low order.)
3. The control field $P_i$ of the current CK is stored to indicate $K_i=A$ or $K_i>A$ under conditions which require this information for searching later CK's. (The prior-cited application Ser. No. 778,876 stored $P_{i+1}$ only in order to define the K field in each current CK, i.e. $CK_i$.)
4. A pointer is readout with a CK having its key byte equal to the current search-argument byte ($K=A$), except that certain right-shift CK's can be ignored. (In the prior-cited application, a pointer is readout only with the first key having a key byte which compared-high with the current search argument byte ($K>A$).)
5. A one-level search of a one key-byte index often continues until reaching the end of index. (The prior-cited applications ended a search whenever $A<K$ using at least a one K format. Also, previously cited application Ser. No. 788,835 ends a search whenever the difference byte position in a key is less than the current setting of the search argument equal counter, ignoring any relationship between K and A.)
6. If the S.A. is not represented in the source uncompressed index, there may be (1) no readout pointer because no CK had a $K=A$, or (2) a noncorrect readout pointer occurs with some CK which has $K=A$, in which case the S.A. does not collate next to the CK with the last readout pointer. (In the prior-cited applications, an S.A. not represented in the source uncompressed index reads-out the pointer with a CK which collates next to the S.A.) In any case, if it is not known whether the S.A. is in the source index, key verification is required by retrieving the record addressed by the last readout pointer.

It is an object of this invention to generate a minimal-size compressed index using bytes selected from a source uncompressed index.

It is a further object of this invention to provide a method and system for generating an index compressed by removal of both sortingdredundancy and noise bytes. (Noise bytes are all lower-ordered UK bytes following a "difference" byte).

It is another object of this invention to provide a method and system which can search a compressed index having a single key byte per CK to reduce the number of bytes needed to be machine scanned during a search. This may greatly increase the machine search speed in relation to searching the source uncompressed index at the same machine byte rate.

It is a further object of this invention to generate and search a compressed index having a fixed size for each key entry which is independent of the length of its corresponding uncompressed key. Each uncompressed key is represented by a single control field and a single key byte. The amount of index compression is therefore not dependent on the "tightness" of the index, i.e. the amount of variation in the sorted relationship among the uncompressed keys in the index.

It is another object of this invention to generate and search a compressed index which has a size dependent only on a number of keys in the source uncompressed index.

Like the prior-filed application No. 788,876, this invention generates a compressed key (CK) from an adjacent pair of uncompressed keys in the sorted uncompressed index. The single key byte for the CK is the highest-order unequal byte position in the second of the compared pair of uncompressed keys. A control field is appended to the single key byte to represent the position of the single key byte in its uncompressed key (UK). The first CK is generated from the first pair of UK's, which respectively comprise a null key and the first real uncompressed key in the index. The second CK is generated from the second pair of UK's, which is the first and second UK's in the index, etc. The second UK in any pair becomes the first UK in the next pair in the sequence for generating the CK's. The pointer with the second UK in a pair is associated with the CK generated from that pair. Any unique indication may be used to indicate the end of the compressed index.

The single key byte in the CK is described by the term "difference byte" in the previously cited application Nos. 788,807 and 788,835.

When searching, an ascending-collated index, the invention derives the following information signals from the relationship among each current CK, its preceding CK's, and the S.A. during a sequential scan of the compressed index:

A. information signals obtained by comparing the p part of each CK with the P part of a prior CK, in some cases:

1. A signal indicating the current CK (i.e. $CK_i$) has a P value (i.e. $P_i$) less than, equal to, or greater than the P value of a prior significant CK (i.e. $P_H$). In other words, the signal indicates whether the current CK is a left-shift CK (i.e. $P_i<P_H$), a no-shift CK (i.e. $P_i=P_H$), or a right-shift CK (i.e. $P_i>P_H$).

B. Information signals obtained by comparing the K byte in the current CK with a current S.A. byte obtained from the $P_i$th position in the S.A.:

1. A signal indicating the current K byte (i.e. $K_i$) is less than (L), equal to (E), or higher than (H) the current A byte. (In other words the signal indicates if $K<A$ (i.e. L), $K=A$ (i.e. E), of $K>A$ (i.e. H).)

C. Information signals based on the L, E or H of the last significant CK (i.e. between first CK and $CK_i$) are stored where it is significant to searching the current CK including:

1. Any significant high (H) condition stores the P value of the current CK (i.e. stores $P_H$).
2. Any significant equal (E) condition for a CK stores the associated pointer and sets an indicator $P_E$.
3. The significance of a stored signal may be a function of whether a $CK_i$ is a left-shift, no-shift, or right shift type.
4. Right shift type CK's are nonsignificant, in which case their signal L, E or H is ignored.

When searching a descending-collated index, the above-stated relationship for an collated index also applies, except that a $K<A$ signal is substituted for the $K>A$ signal, and a $K>A$ signal is substituted for the $K<A$ signal. Also $P_L$ is substituted for $P_H$ (i.e. L meaning low, and H meaning high.)

For searching, the invention uses two indicators, which may be called an equal indicator and an unequal indicator; either can be implemented with a bistable storage device capable of having a set state and a reset state. The equal indicator may be set to represent a significant state when a CK has its K byte equal to the corresponding A byte, which is the A byte at the current $P_i$ position. A CK setting the equal indicator has its associated registered in a machine-storage device. The unequal indicator may be set to a significant state when a CK produces a $K>A$ signal in an ascending-collated index, or produces a $K<A$ signal in a descending-collated index. The position indication ($P_i$) with a CK setting the unequal indicator is registered in a machine-storage device. Other conditions determine when either or both indicators are placed in a reset state to indicate nonsignificance.

The foregoing and other objects, features and advantages of the invention will be apparent from the following more particular description of preferred embodiments of the invention, as illustrated in the accompanying drawings.

FIG. 1A illustrates an uncompressed index; and FIG. 1B illustrates a compressed index derived therefrom;

FIGS. 2A and B illustrates a buffer and input-output circuits used for storing or reading an uncompressed index or a compressed index;

Figure 10A:
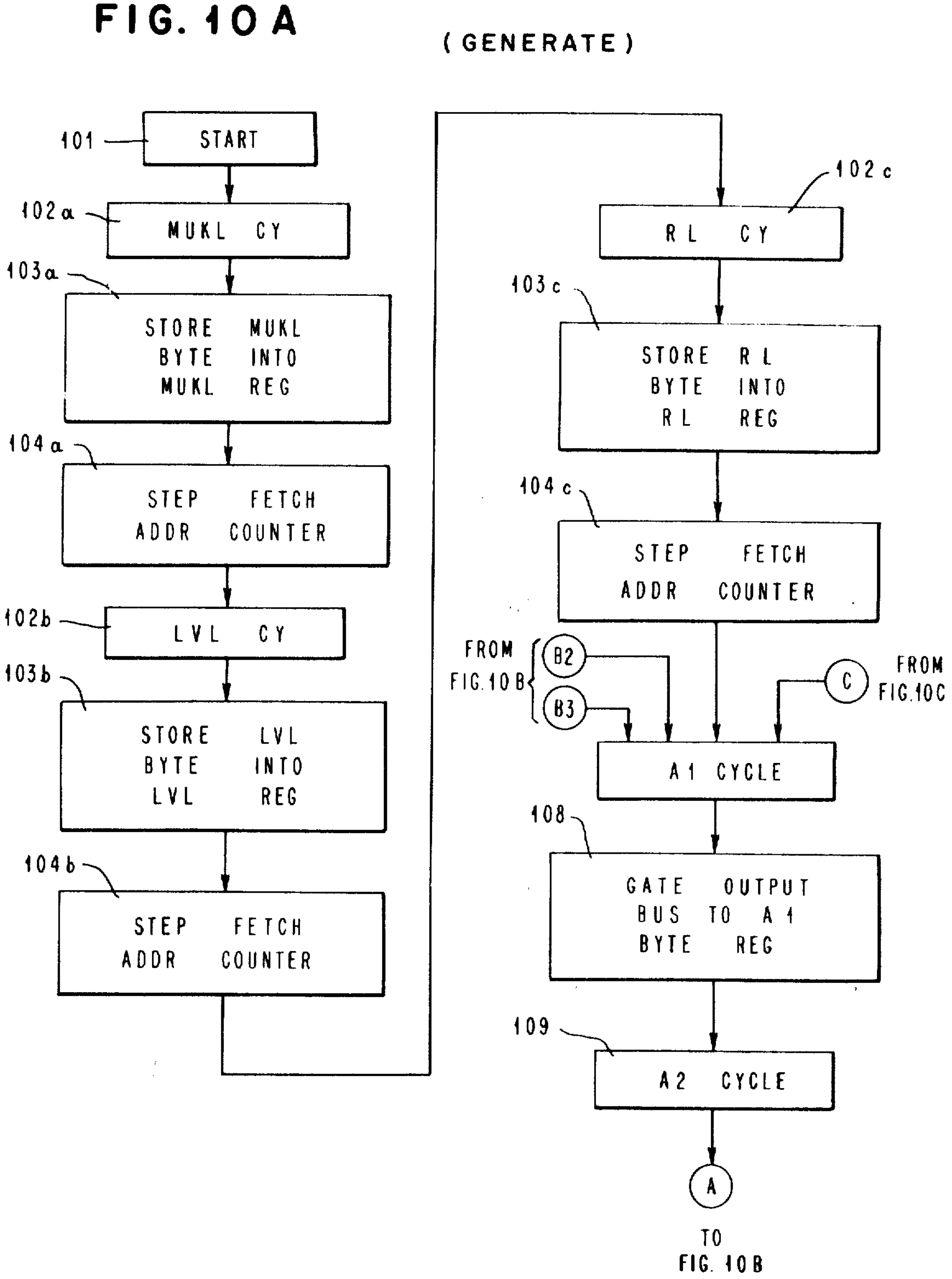
Figure 10B:
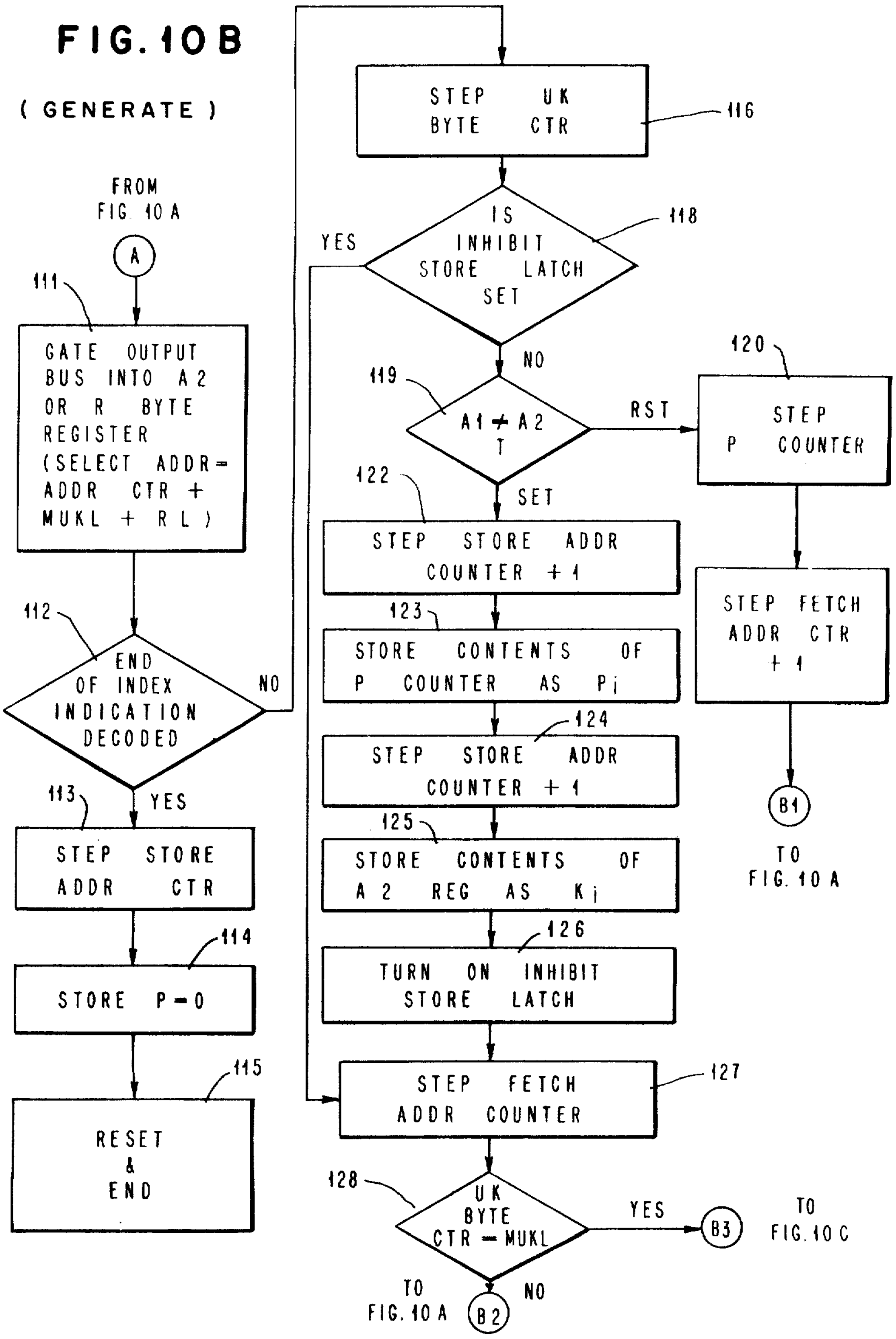
Figure 10C:
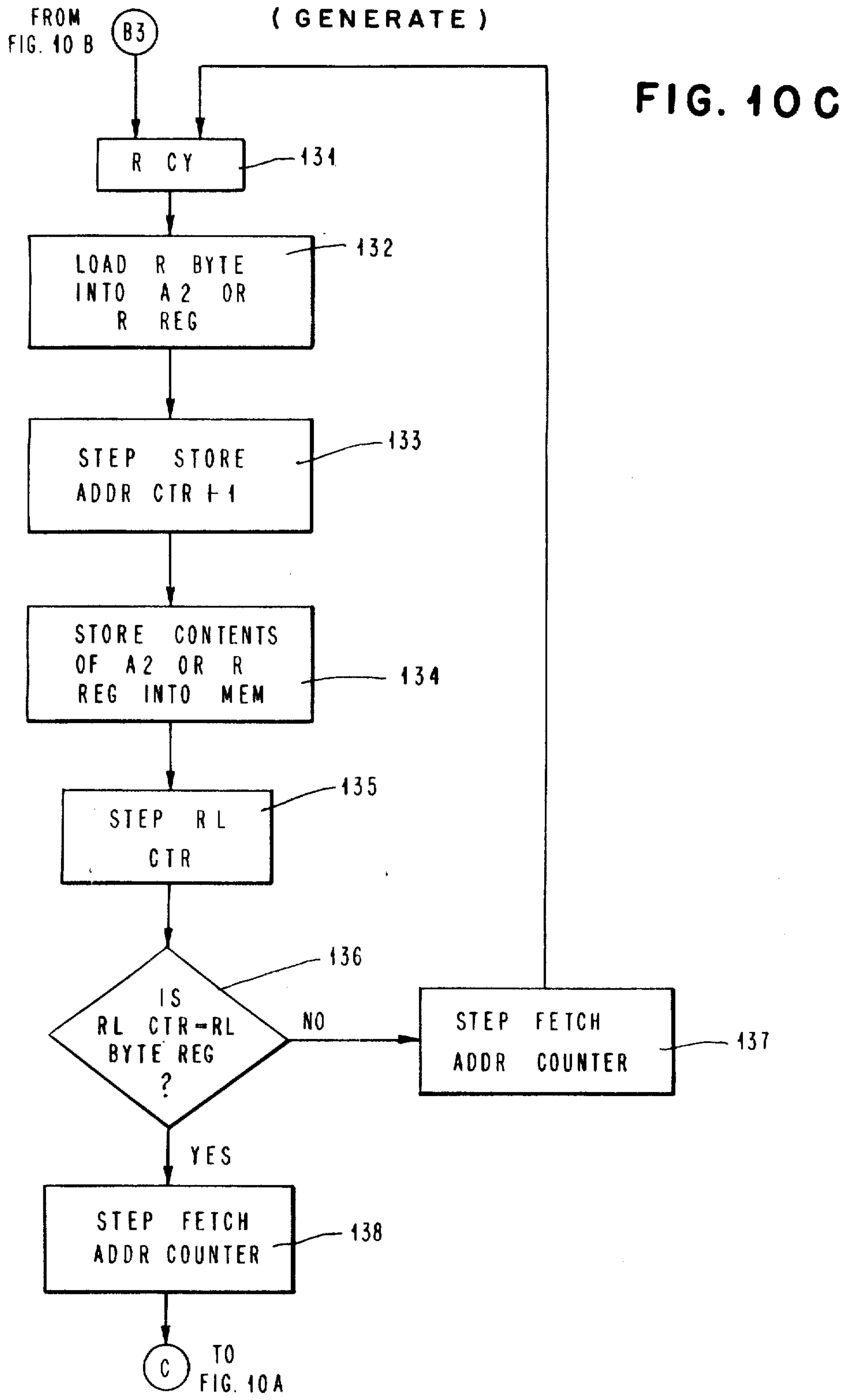
Figure 17:
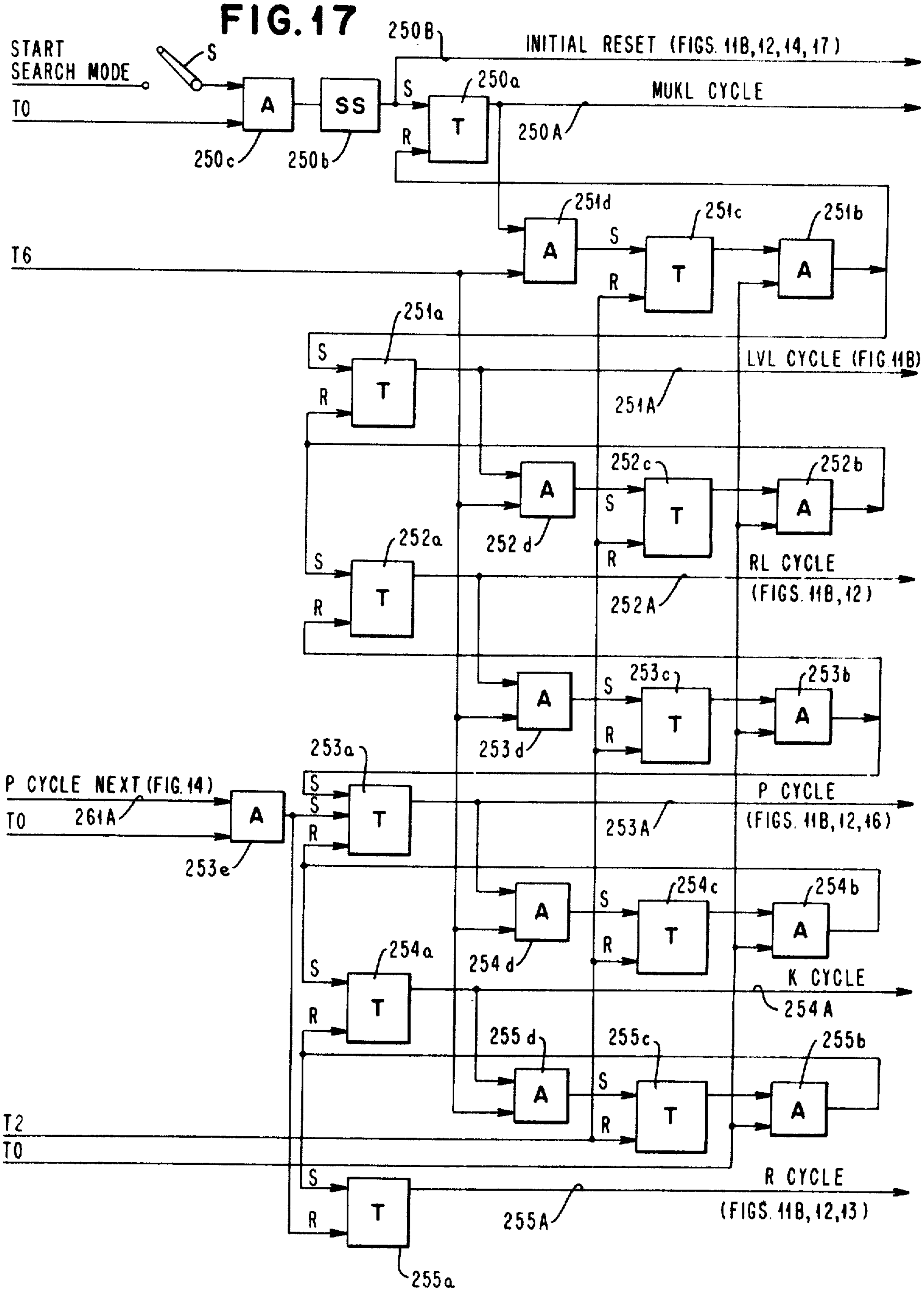
Figure 18:
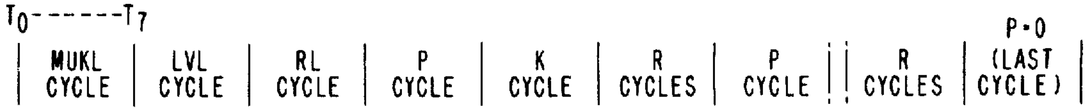

FIGS. 10A–C represent a method embodiment used during generate mode;

FIGS. 11A, 11B, 12, 13, 14, 15 and 16 represent circuits used in searching a one key-byte compressed-key index;

FIG. 17 illustrates a search-mode clock control circuit;

FIG. 18 illustrates search mode clock cycles generated by the control circuit in FIG. 17; and FIGS. 19A, 19B, 19C and 19D represent a method embodiment used during search mode.

GENERATE MODE–GENERAL

In generate mode, the input to this invention is a sequence of uncompressed keys (UK's) in sorted order. The keys may comprise a search index for any type of items. For example, each key may be a name, a man number, or any descriptor in alphabetic, numeric, and/or special character form which may represent an item such as a magnetic record, paper file, or inventory device, etc. The address (location) of the item which the key represents is carried along with each key. Such address is referred to hereafter as a "pointer" since the address in effect "points" to the location of the source item represented by the key. Although the items are preferably in machine-accessible form, they also may be manually retrievable by using the pointers. The actual locations of the items may be in any order in relation to their keys; that is, they may be located randomly, sequentially, etc.

If the uncompressed keys are initially obtained in an unsorted order, they are arranged in a sorted sequence before beginning the operation of the generate mode in this invention. Examples of uncompressed key sequences are the names in a telephone directory, the names of people in the United States, the man numbers of the employees in a corporation, the titles of all the books in a library, part numbers of items in an inventory, etc. No two uncompressed keys may be the same in the sequence; for example, a name and address comprise an uncompressed key in a telephone directory in order to distinguish like names.

The sorted key order is determined by a chosen collating character sequence, such as numeric, alphabetic, EBCDIC, ASCII, etc. For example, the alphabetic collating sequence is used in the telephone directory, or in a language dictionary. When sorting the keys, the pointer with each key is carried along with it to wherever it is positioned in the sorted sequence. For the purposes of the detailed description of this invention, ascending sequences are assumed; but it will be clear that the same principles apply to descending sequences.

If the UK sequence is very long, it may be broken into sequential subgroups within the overall sequence. The size of the smaller sequential groups may be chosen to be compatible with a physical record size used by an I/O device in a computer system. Each such physical record may be handled as a separate input unit for purposes of this invention.

Each such subgroup will hereafter be referred to as an "uncompressed index record."

Ascending UK sorts are presumed throughout this specification for clarity in explanation. The invention is likewise applicable to descending UK sorts by the reversal collating rules. No change is needed in generating a compressed index having a descending sort. A change in searching a compressed index having a descending sort is in reversing the relationships depending on $K>A$ or $K<A$; thus $P_L$ may replace $P_H$ under like conditions, where $P_L$ is $P_i$ when $K<A$. The meaning of $P_H$ is explained in detail in the search embodiments.

Each of the following TABLES A, B, C and D represents a UK index.

The UK's in their sorted index, may be identified by a sequence number beginning with one for the first CK and incrementing by one for each following UK, as is illustrated in each of TABLES A, B, C, and D. Then any particular UK may be identified by the sequence member $i$.

For generating a corresponding compressed index, the UK's are sequentially taken in pairs from the UK index, with the second UK of the last pair becoming the first UK of the next pair. The UK's comprising any pair are compared in order to generate a corresponding compressed key (CK). Hereafter any current pair of UK's being compared are referred to as the $i-1$ and $i$ UK's, which respectively represent the first and second UK's in the pair.

Every comparison of a UK pair is considered to begin from the high-order character side of the uncompressed keys. The comparison procedes between like-ordered bytes until a byte position where the first unequal pair of bytes is sensed. If one UK ends before the other, an inequality occurs there by definition. Sufficient information is available at the unequal comparison to generate the P and K parts of the corresponding CK.

Each CK is comprised of two parts, a position part (P), and one key part (K).

The P part represents the location of the first unequal bytes in the compared UK pair, and it indicates that location by the number of bytes between it and the high-order side of the UK's being compared. If two UK's compare unequal at their highest-order byte positions, P has a value of one. If the first byte positions compare equal, and the second byte positions are unequal, P has a value of two. Thus, P is one or greater for any real CK. A zero following the last CK in the index can then be recognized as a P having a unique value that indicates end of record.

The K part is the first unequal byte taken from the second UK in each compared pair of UK's. The particular byte taken for the K field therefore is the highest-order unequal byte in the second UK of the compared pair of UK's.

The first compressed key (CK) at the top of each TABLE A, B, C, and D is derived from a comparison of a dummy key and the first uncompressed key (UK) at the beginning of the respective uncompressed index. A dummy key is simulated to represent the lowest possible key in the collating sequence; and for example, it may be eight binary zeros when using the ECBDIC character set, i.e. its null character. Thus an unequal occurs in comparing the highest-order byte positions. Hence the first CK has a P of one, and a K which is the first byte of the first UK.

The second CK is derived by comparing the first and second UK's which comprise the second UK pair, etc. Finally, the last CK is derived when the last two UK's in the index are compared. An end of index indication is then provided after the last CK, and it may be a zero.

The pointer address R1 associated with the first UK is placed with the first CK after the first UK comparison, etc., until the pointer address associated with the last UK is placed with the last CK after the last UK comparison.

Figures 1A, 1B:
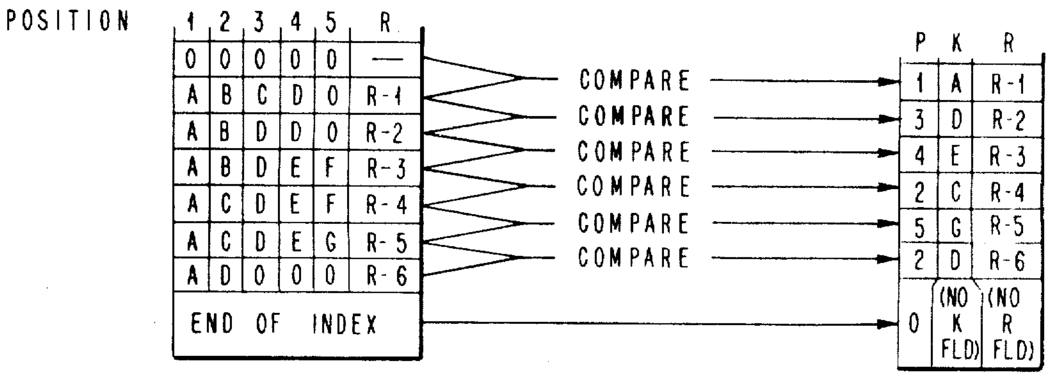

FIG. 1A represents an uncompressed index record, while FIG. 1B represents the compressed keys generated therefrom by this invention, with corresponding pointers.

In each TABLE A, B, C, or D, each byte in each UK is represented by a symbol B, K or N. Each comparison of bytes in any $UK_i$ with like-ordered bytes in its preceding $UK_{i+1}$ begins with a comparison of their highest-ordered byte position (leftmost byte positions in each UK in a TABLE). A B indicates equality for any byte with the like-ordered byte (in the same column) in the adjacent prior UK. A K indicates the first inequality for a byte in a UK with the like-ordered byte in the adjacent UK. A N indicates all bytes in each UK which are lower-ordered than its K byte, i.e. to the right of the K byte, and their comparative byte relationship is not determined since it is not needed.

During such byte comparisons in a collated UK index, the K byte position may be anywhere (except for the first UK), as determined by which byte in each next UK is responsible for it collating higher than the preceding UK. Therefore, any K byte can shift to a different position (right or left shift) from the preceding K byte position, or the K byte can remain at the same position (no-shift).

This K byte shifting has peculiar properties which are important in the searching of one-key byte compressed indexes. Accordingly, a rigorous definition is needed for this shifting property: a left-shift occurs when $P_i<P_{i+1}$; a no-shift occurs when $P_i=P_{i+1}$; and a right-shift occurs when $P_i>P_{i+1}$. The shift variation is represented in each of TABLES A, B, C AND D by the solid and dashed lines. The solid line is drawn to the right of each K byte; and the dashed line is drawn to the left of each K byte. The shift variation is fixed within any particular UK index, but it is arbitrary among UK indexes in general. Tables A, B and C each emphasize a particular type of shift. That is, TABLE A emphasizes left-shift UK's, TABLE B emphasizes right-shift UK's and TABLE C emphasizes no-shift UK's. TABLE D represents a generalized UK index with an illustrated shift distribution which is arbitrarily assumed.

Specific relationships exist between adjacent and nonadjacent bytes of the same order (i.e. same table column) in a sorted UK index, such as in TABLE D. For example, B represents a byte as being equal to its adjacent preceding byte in the same column; K represents the byte as the highest order byte in the UK which is unequal to its adjacent preceding byte; and N represents that an unknown relationship exists, i.e. N could be any of equal to, greater than, or less than its preceding byte of the same-order.

The following TABLE E provides the general rules which relate any byte to any preceding byte of the same order in the sorted UK index. These rules are particularly useful in understanding the searching of a compressed index for a search argument which is equal to one of the UK's in the index. This will be discussed later in relation to the search mode.

TABLE A

| | UK field | | | | | | | | | | | | Pointer field | | | | | | |
|---|---|---|---|---|---|---|---|---|---|---|---|---|---|---|---|---|---|---|---|
| Seq. No. | 1 | 2 | 3 | 4 | 5 | 6 | 7 | 8 | 9 | 10 | 11 | | P | 1 | 2 | 3 | 4 | 5 | 6 |
| 1 | K | N | N | N | N | N | N | N | N | N | N | → | 1 | R | R | R | R | R | R |
| 2 | B | B | B | B | B | B | B | B | K | N | N | → | 9 | R | R | R | R | R | R |
| 3 | B | B | B | B | B | K | N | N | N | N | N | → | 6 | R | R | R | R | R | R |
| 4 | B | B | B | K | N | N | N | N | N | N | N | → | 4 | R | R | R | R | R | R |
| 5 | B | B | K | N | N | N | N | N | N | N | N | → | 3 | R | R | R | R | R | R |
| 6 | B | K | N | N | N | N | N | N | N | N | N | → | 2 | R | R | R | R | R | R |
| 7 | K | N | N | N | N | N | N | N | N | N | N | → | 1 | R | R | R | R | R | R |

TABLE B

| Seq. No. | UK field 1 | 2 | 3 | 4 | 5 | 6 | 7 | 8 | 9 | 10 | 11 | | Pointer field P | 1 | 2 | 3 | 4 | 5 | 6 |
|---|---|---|---|---|---|---|---|---|---|---|---|---|---|---|---|---|---|---|---|
| 1 | K | N | N | N | N | N | N | N | N | N | N | → | 1 | R | R | R | R | R | R |
| 2 | B | B | K | N | N | N | N | N | N | N | N | → | 3 | R | R | R | R | R | R |
| 3 | B | B | B | B | K | N | N | N | N | N | N | → | 5 | R | R | R | R | R | R |
| 4 | B | B | B | B | B | B | B | K | N | N | N | → | 8 | R | R | R | R | R | R |
| 5 | B | B | B | K | N | N | N | N | N | N | N | → | 4 | R | R | R | R | R | R |
| 6 | B | B | B | B | B | K | N | N | N | N | N | → | 6 | R | R | R | R | R | R |
| 7 | B | B | B | B | B | B | K | N | N | N | N | → | 7 | R | R | R | R | R | R |
| 8 | B | B | B | B | B | B | B | B | B | B | K | → | 11 | R | R | R | R | R | R |

TABLE C

| Seq. No. | UK field 1 | 2 | 3 | 4 | 5 | 6 | 7 | 8 | 9 | 10 | 11 | | Pointer field P | 1 | 2 | 3 | 4 | 5 | 6 |
|---|---|---|---|---|---|---|---|---|---|---|---|---|---|---|---|---|---|---|---|
| 1 | K | N | N | N | N | N | N | N | N | N | N | → | 1 | R | R | R | R | R | R |
| 2 | B | B | B | B | B | B | K | N | N | N | N | → | 7 | R | R | R | R | R | R |
| 3 | B | B | B | B | B | B | K | N | N | N | N | → | 7 | R | R | R | R | R | R |
| 4 | B | B | B | B | B | B | K | N | N | N | N | → | 7 | R | R | R | R | R | R |
| 5 | B | B | B | B | B | B | K | N | N | N | N | → | 7 | R | R | R | R | R | R |
| 6 | B | B | B | B | B | B | K | N | N | N | N | → | 7 | R | R | R | R | R | R |
| 7 | B | B | B | B | B | B | K | N | N | N | N | → | 7 | R | R | R | R | R | R |
| 8 | B | B | B | B | B | B | K | N | N | N | N | → | 7 | R | R | R | R | R | R |
| 9 | B | B | B | B | B | B | K | N | N | N | N | → | 7 | R | R | R | R | R | R |
| 10 | B | B | B | B | B | B | K | N | N | N | N | → | 7 | R | R | R | R | R | R |

TABLE D

| Seq. No. | UK field 1 | 2 | 3 | 4 | 5 | 6 | 7 | 8 | 9 | 10 | 11 | 12 | 13 | 14 | | Pointer field P | 1 | 2 | 3 | 4 | 5 | 6 |
|---|---|---|---|---|---|---|---|---|---|---|---|---|---|---|---|---|---|---|---|---|---|---|
| 0 | K | N | N | N | N | N | N | N | N | N | N | N | N | N | → | 1 | R | R | R | R | R | R |
| 1 | B | B | B | B | K | N | N | N | N | N | N | N | N | N | → | 5 | R | R | R | R | R | R |
| 2 | B | B | B | B | B | B | K | N | N | N | N | N | N | N | → | 7 | R | R | R | R | R | R |
| 3 | B | B | B | B | B | B | B | B | B | K | N | N | N | N | → | 10 | R | R | R | R | R | R |
| 4 | B | B | B | B | B | B | B | B | B | B | B | K | N | N | → | 12 | R | R | R | R | R | R |
| 5 | B | B | B | B | B | B | B | B | B | B | B | B | K | N | → | 13 | R | R | R | R | R | R |
| 6 | B | B | B | B | B | B | B | B | B | K | N | N | N | N | → | 10 | R | R | R | R | R | R |
| 7 | B | B | B | B | B | B | B | K | N | N | N | N | N | N | → | 8 | R | R | R | R | R | R |
| 8 | B | B | B | B | B | B | K | N | N | N | N | N | N | N | → | 7 | R | R | R | R | R | R |
| 9 | B | B | K | N | N | N | N | N | N | N | N | N | N | N | → | 3 | R | R | R | R | R | R |
| 10 | B | B | K | N | N | N | N | N | N | N | N | N | N | N | → | 3 | R | R | R | R | R | R |
| 11 | B | B | K | N | N | N | N | N | N | N | N | N | N | N | → | 3 | R | R | R | R | R | R |
| 12 | B | B | K | N | N | N | N | N | N | N | N | N | N | N | → | 3 | R | R | R | R | R | R |
| 13 | B | B | K | N | N | N | N | N | N | N | N | N | N | N | → | 3 | R | R | R | R | R | R |
| 14 | B | B | K | N | N | N | N | N | N | N | N | N | N | N | → | 3 | R | R | R | R | R | R |
| 15 | B | B | B | B | B | B | K | N | N | N | N | N | N | N | → | 7 | R | R | R | R | R | R |
| 16 | B | B | B | B | K | N | N | N | N | N | N | N | N | N | → | 5 | R | R | R | R | R | R |
| 17 | B | B | B | B | B | B | B | B | K | N | N | N | N | N | → | 9 | R | R | R | R | R | B |
| 18 | B | B | B | B | B | K | N | N | N | N | N | N | N | N | → | 6 | R | R | R | R | R | R |
| 19 | B | B | B | B | B | K | N | N | N | N | N | N | N | N | → | 6 | R | R | R | R | R | R |
| 20 | B | B | B | B | B | K | N | N | N | N | N | N | N | N | → | 6 | R | R | R | R | R | R |
| 21 | B | B | B | B | B | B | B | B | B | K | N | N | N | N | → | 10 | R | R | R | R | R | R |
| 22 | B | B | B | B | B | B | B | B | B | B | B | K | N | N | → | 12 | R | R | R | R | R | R |
| 23 | B | B | B | B | B | B | B | B | B | B | B | K | N | N | → | 12 | R | R | R | R | R | R |
| 24 | B | B | B | B | B | B | B | B | B | B | B | K | N | N | → | 12 | R | R | R | R | R | R |
| 25 | B | B | B | B | B | B | B | B | K | N | N | N | N | N | → | 9 | R | R | R | R | R | R |
| 26 | B | B | B | B | B | B | K | N | N | N | N | N | N | N | → | 7 | R | R | R | R | R | R |
| 27 | B | B | B | B | K | N | N | N | N | N | N | N | N | N | → | 5 | R | R | R | R | R | R |
| 28 | B | B | B | B | K | N | N | N | N | N | N | N | N | N | → | 5 | R | R | R | R | R | R |
| 29 | B | B | B | B | K | N | N | N | N | N | N | N | N | N | → | 5 | R | R | R | R | R | R |
| 30 | B | B | K | N | N | N | N | N | N | N | N | N | N | N | → | 3 | R | R | R | R | R | R |
| 31 | N | N | K | N | N | N | N | N | N | N | N | N | N | N | → | 1 | R | R | R | R | R | R |
| 32 | K | N | N | N | N | N | N | N | N | N | N | N | N | N | → | 1 | R | R | R | R | R | R |
| 33 | B | B | B | B | B | B | B | B | B | K | N | N | N | N | → | 10 | R | R | R | R | R | R |
| 34 | B | B | B | B | B | B | B | B | B | B | K | N | N | N | → | 11 | R | R | R | R | R | R |
| 35 | B | B | B | B | B | B | B | B | B | B | K | N | N | N | → | 11 | R | R | R | R | R | R |
| 36 | B | B | B | B | K | N | N | N | N | N | N | N | N | N | → | 5 | R | R | R | R | R | R |
| 37 | B | B | B | B | K | N | N | N | N | N | N | N | N | N | → | 5 | R | R | R | R | R | R |
| 38 | END OF INDEX | | | | | | | | | | | | | | | 0 | | | | | | |

SAME-ORDER RELATIONSHIP TABLE—E (Byte Relationships within a column for a Collated Index)

| | | |
|---|---|---|
| B after B, K or N | | |
| a. Adjacent in column | | B = B, K or N |
| b. Intervening B's | B = B, K or N | |
| c. Intervening K's | B > B, K or N | |
| d. Intervening N's | $B \overset{=}{\not>}$ B, K or N | |
| K after B, K or N | | |
| a. Adjacent in column | | K > B, K or N |
| b. Intervening B's | K > B, K or N | |
| c. Intervening K's | K > B, K or N | |
| d. Intervening N's | $K \overset{=}{\not>}$ B, K or N | |
| N after B, K or N | | |
| a. Adjacent in column | | $N \overset{=}{\not>}$ B, K or N |
| b. Intervening B's | $N \overset{=}{\not>}$ B, K or N | |
| c. Intervening K's | $N \overset{=}{\not>}$ B, K or N | |
| d. Intervening N's | $N \overset{=}{\not>}$ B, K or N | |

The pointer (R) associated with the *i* uncompressed key (while comparing the *i* and *i*—1 UK's) is appended with the *i* compressed key to provide a single-K compressed index of the form, PKR.

GENERATE MODE METHOD AND SYSTEM EMBODIMENTS

Figure 2A:
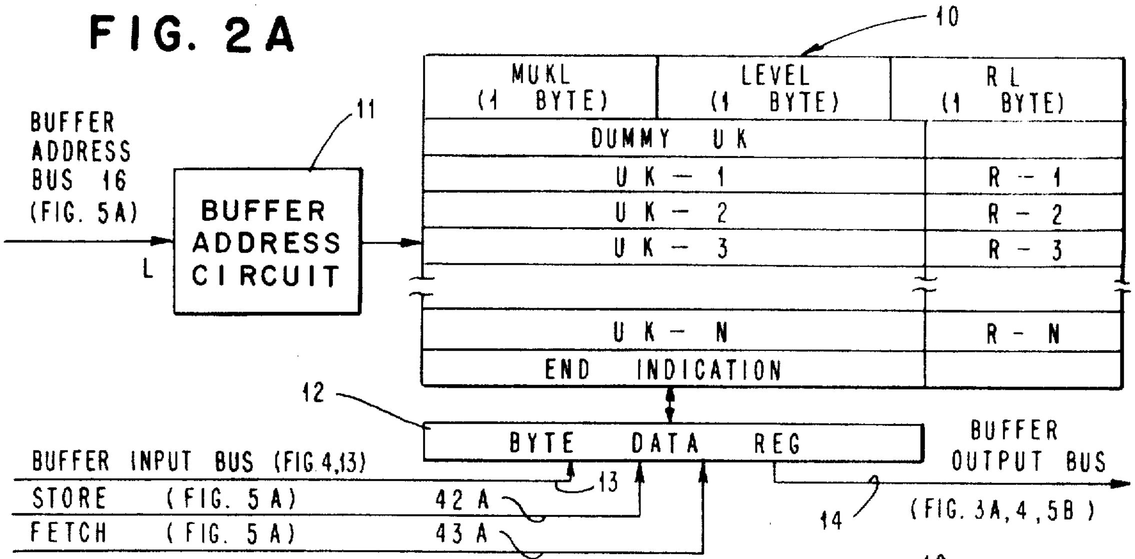

FIGS. 10A, B and C show an embodiment of the method used by this invention to generate a one-key byte per CK type of compressed index. FIGS. 3–9 provide an embodiment of circuits and timing which are consistent with the method embodiment shown in FIGS. 10A–C. The method embodiment begins after memory buffer 10 is loaded as shown in FIG. 2A. Buffer 10 stores data in bytes (characters), each for example may comprise six or eight data bits. (Each stored byte may include also a conventional parity bit for error checking. Since the parity bit is not important to the basic objectives of this invention, it is not further discussed.) The manner of input of an index into buffer 10 is not part of this invention, but it will be evident that such input can be provided by conventional programming of a general purpose computer.

The circuits disclosed herein operate on a clock cycling basis. All clock operations are synchronized by output clock pulses T0–T7 in FIG. 7. The upper set of pulses T0–T7 from a ring 45 synchronize the generate mode operations. A mode trigger 55 is set by a start generate mode signal. A set of pulses T0–T7 are transmitted for each UK byte being handled. That is, an entire T0–T7 cycling sequence occurs once per fetching of a byte from buffer 10.

Figure 8:
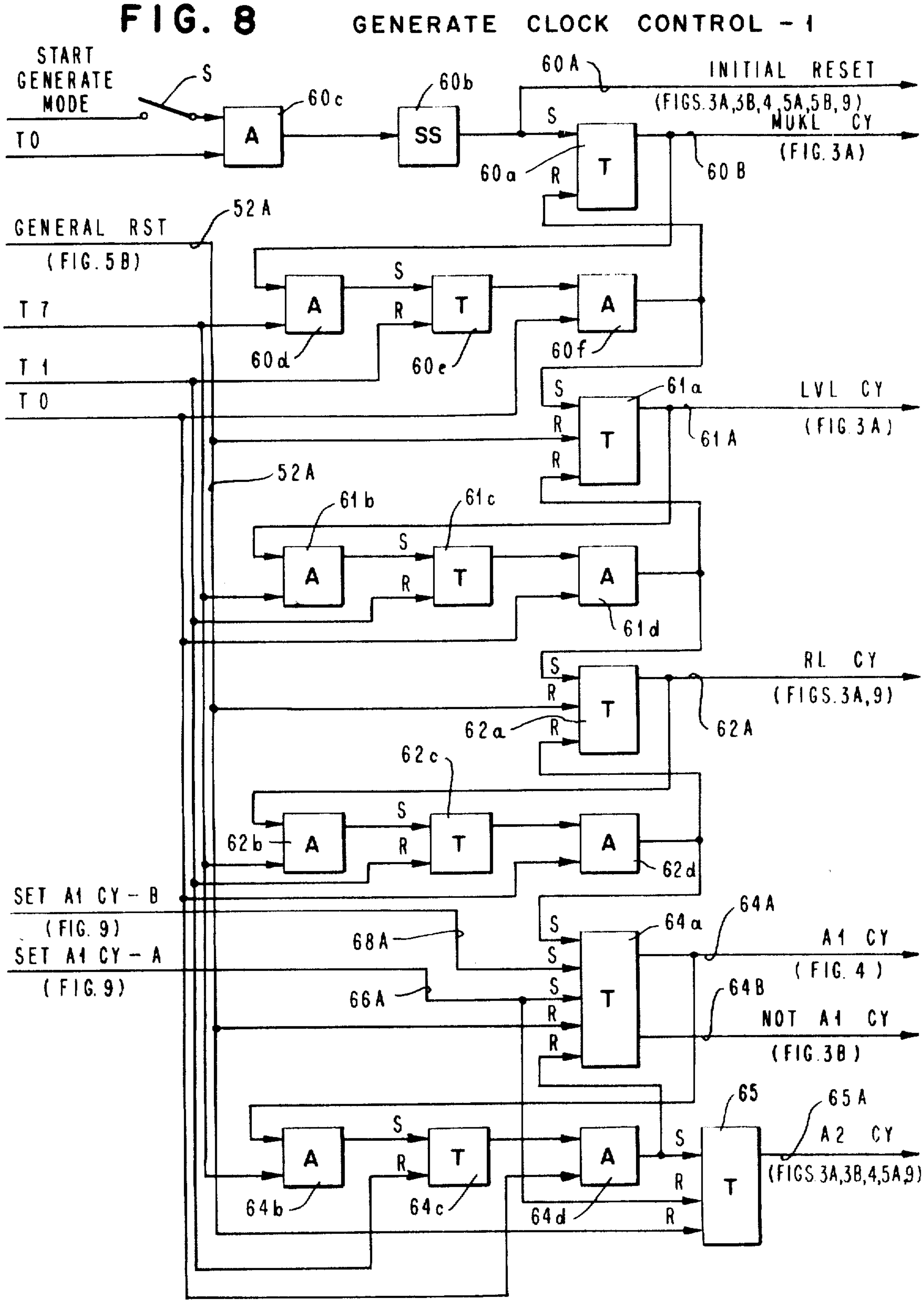
FIGS. 8 and 9 represent generation mode clock controls.
Figure 9:
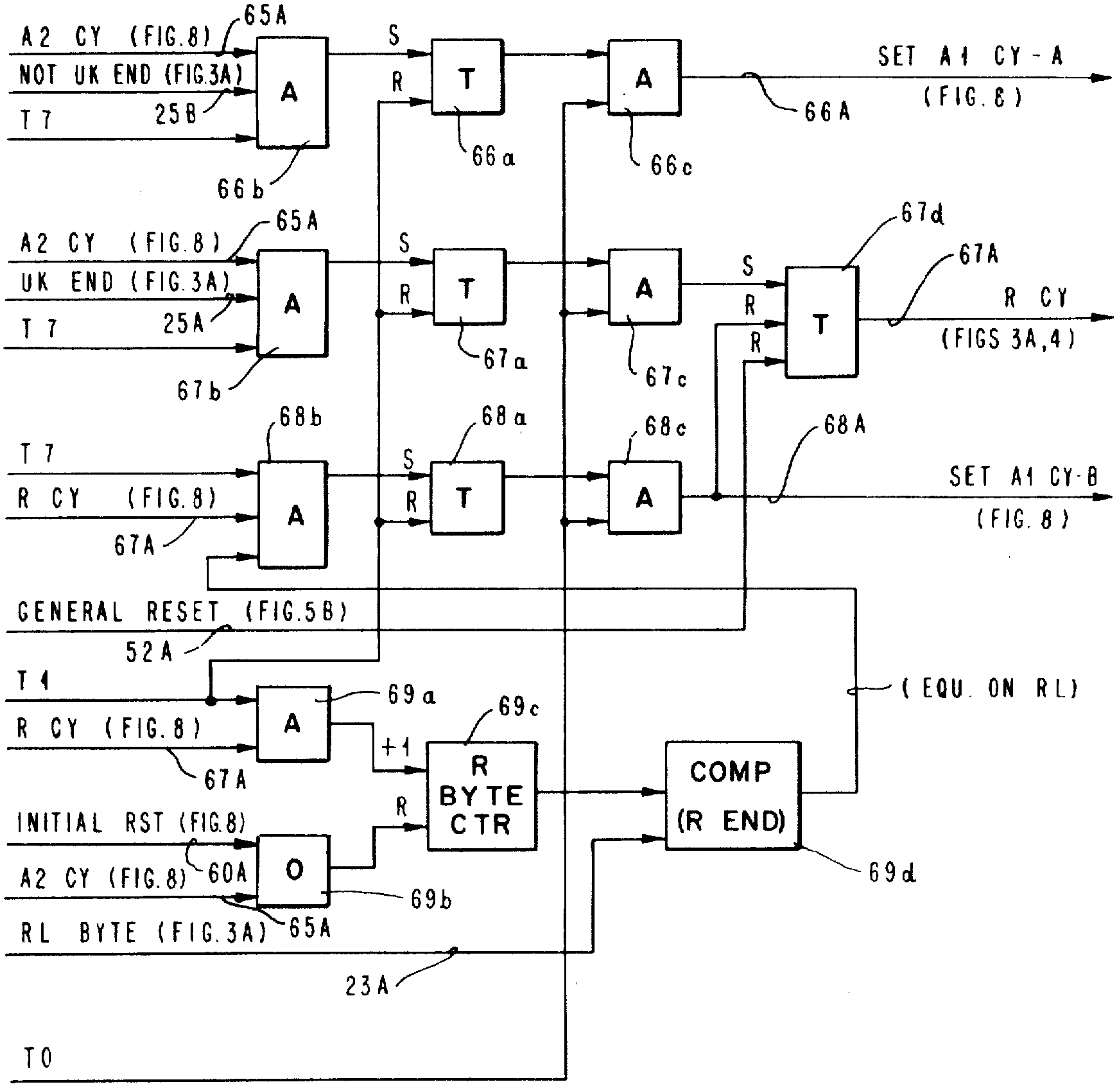

The clock controls in FIGS. 8 and 9 determine the cycling sequence required for the described operation. Both sequential cycling and out-of-order (branching) cycling are generated by the clock control in FIGS. 8 and 9.

Figure 7:
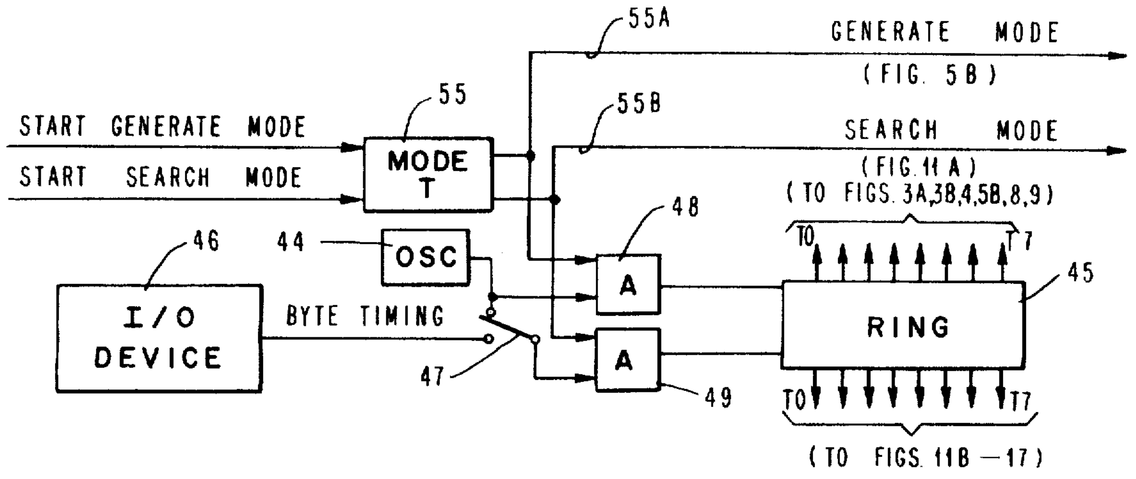
FIG. 7 shows a clock pulsing and mode control arrangement.

In FIG. 7 mode trigger 55, starts set by a start generate mode signal (which may be derived from a computer instruction), enables an AND gate 48 to pass pulses from an oscillator 44 to ring circuit 45 which then provides output pulses T0–T7 to the generate circuits.

The start generate mode signal also starts the cycling of the clock controls in FIG. 8, and this generates an initial reset signal from a single-shot **60*b* in FIG. 8**.

Figure 6A:
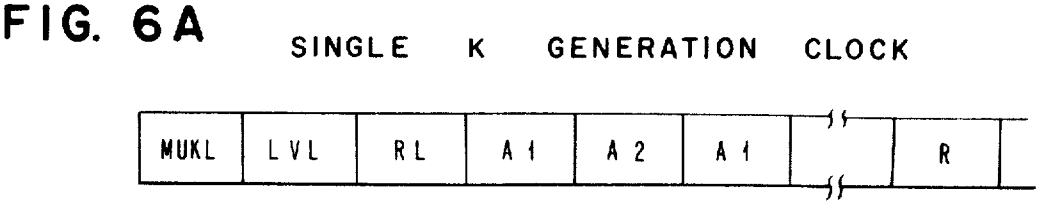
FIGS. 6A and 6B illustrate generation mode clock timing from the illustrated circuits.
Figure 6B:
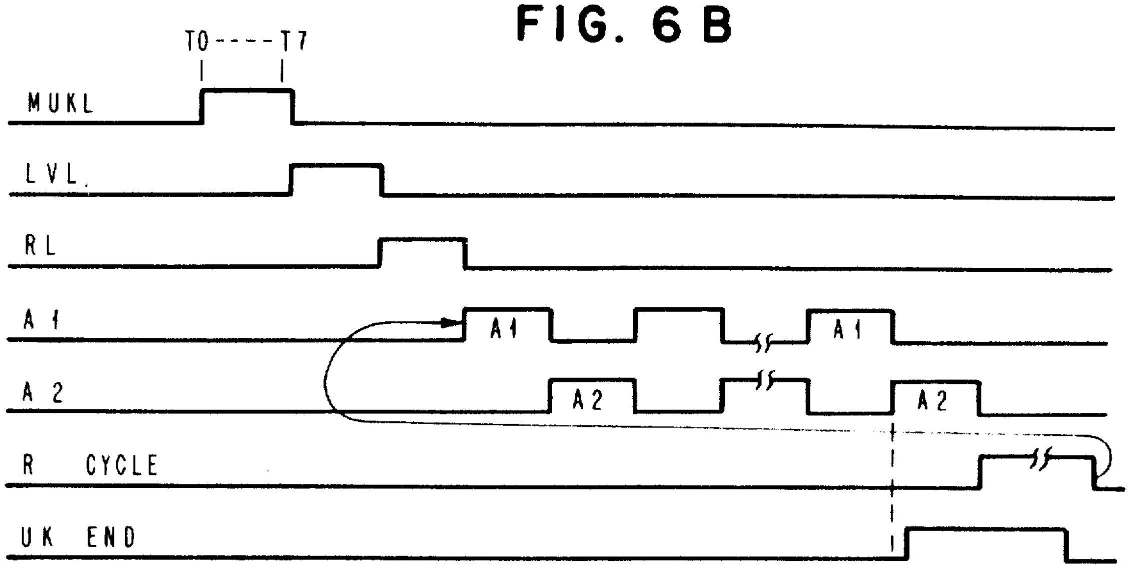

The clock controls in FIGS. 8 and 9 generate six types of cycles, each used for a different purpose. The types of cycles and their sequencing is represented in FIG. 6A. Each set of output pulses T0–T7 occurs during each of the six types of cycles MUKL, LVL, RL, A1, A2, and R shown in FIGS. 6A and 6B. FIG. 6B provides wave forms representing the timing for the different signals. In FIG. 6B a cycle is active when any wave is at high level, and it is inactive at the down level.

Figures 3A, 3B:
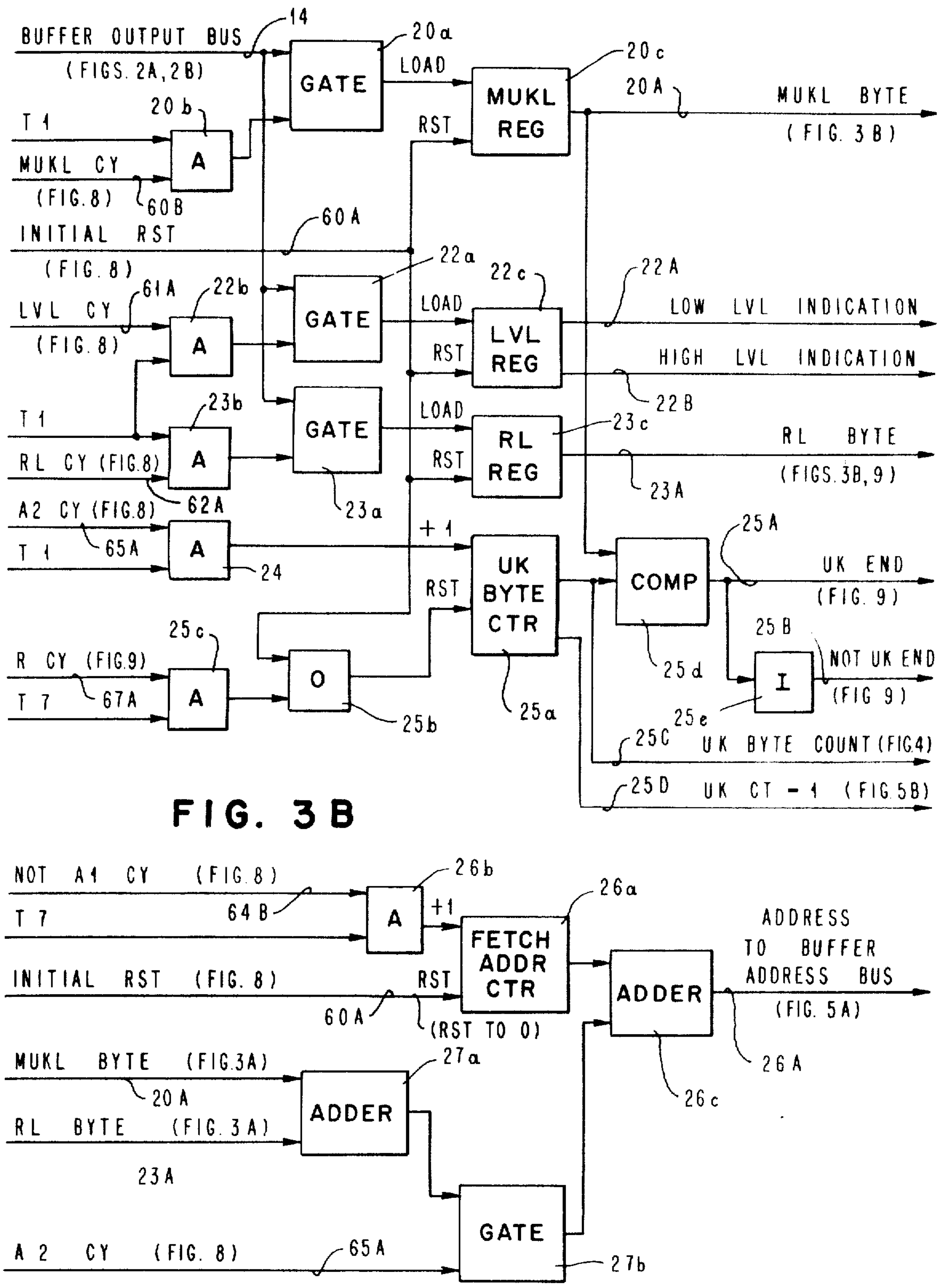
FIGS. 3A, 3B, 4, 5A and 5B represent circuitry for controlling the generation of one key byte compressed keys.

Each of these six types of clock control cycles, except an A1 cycle, advances the address in a fetch address counter **26*a* in FIG. 3B by one byte location. The first byte in buffer 10 is addressed during the MUKL cycle which induces the transfer of the MUKL byte from memory 10 to a MUKL register 20*c* in FIG. 3A. A LVL cycle immediately follows to cause the transfer of the level byte to a LVL register 22*c*** in FIG. 3A. The level byte should indicate that a low level compressed index should be generated.

An RL cycle then follows to similarly transfer the pointer length (RL) byte to RL register **23*c*** in FIG. 3A.

In FIG. 10A, start step 101 begins the operation of the invention. This is executed by the generate mode start signal to the circuit in FIG. 7, and to a generate clock controls in FIG. 8. The start signal may be initiated in a number of ways. It may be generated manually by closing a switch S in FIG. 8, or it may be electronically provided. The latter is preferably done by having the start signal initiated from a computer system in response to execution of a particular instruction that may be conventional. The instruction may be a particular Channel Command Word (CCW) when the subject invention is provided in a computer channel or in an input-output (I/O) device control. When the invention is entirely executed in the computer's central processing unit (CPU), a special instruction, such as particular supervisory call (SVC) instruction may start the operations. In any case, the instruction operation code or SVC interrupt code needs to distinguish between the Generate Mode and Search Mode to bring up the correct start signal.

The first three bytes in buffer 10 in FIG. 2A are flag bytes which define the data organization in the buffer. In FIG. 10A, steps 102 through 104 store each flag byte in a respective one of registers **20*c*, 22*c* and 23*c* in FIG. 3A. The initial byte MUKL contains a value that defines the length (in bytes) of each UK register (UK-1, UK-2.......UK-N) in buffer 10**. That is, each UK register has the length of the registered value of MUKL (Maximum Uncompressed Key Length).

Thus step **102*a* is the initiation of the MUKL cycle on line 60A generated by the clock control in FIG. 8 in response to the start signal causing the setting of a trigger 60*a***.

Step **103*a* uses the MUKL cycle to transfer the MUKL flag byte from buffer 10 to register 20*c* in FIG. 3A. The MUKL cycle signal activates AND circuit 20*b* which enables gate 20*a* to pass the MUKL byte from buffer output bus 14 to MUKL register 20*c*. The MUKL byte appears on bus 14 because fetch address counter 26*a* in FIG. 3B addresses this byte when initially reset to the zero address by the start signal on initial reset line 60A from FIG. 8. The output of counter 26*a* is provided through an Adder 26*c* to line 26A and to gate 43 in FIG. 5A, which at time T1 passes it to the buffer address bus 16, and activates fetch line 43A to byte data register 12 in FIG. 2A to cause the transfer from buffer 10 to buffer output bus 14**.

Step **103*a* is executed at T7 during the MUKL cycle when AND circuit 26*b* steps counter 26*a* for addressing the next byte, LVL. AND circuit 26*b*** is stepped at T7 during every cycle, except the A1 cycle.

Next steps **102*b*, 103*b* and 104*b* are executed similarly to prior steps 102*a*, 103*a*, and 104*a* to pass the LVL byte to register 22*c* in FIG. 3A. The LVL byte designates a level (LVL) for the compressed index which is to be generated from the uncompressed index in buffer 10** initially. The LVL byte indicates where to a multilevel compressed index that the index being generated will fit into the lowest index level in a multilevel index structure, such as disclosed and claimed in the previously cited application Ser. No. 836,930. Accordingly the LVL byte may be preset to one, which indicates the lowest index level.

Then steps 102c and 103c and 104c execute similarly to transfer the RL byte into register 23c. The RL byte follows to provide the length in bytes of each pointer register (R-1, R-2........R-N) respectively following an associated UK register. The number of bytes needed for each pointer register depends on the type of address used to fetch an item to be retrieved. For example, if it is a block stored on any of plural discs, a 10-byte length might be provided.

The use of the MUKL and RL flag bytes permits the sizes of the UK and R registers to easily be varied under different situations where the maximum length for the received uncompressed keys or pointers may be different. No change need be made to the size of buffer 10 to accommodate a larger number of uncompressed keys and pointers when the maximum size of either or both is made smaller, merely by entering smaller values in either or both flag bytes.

When step 107 is reached, the initiatization of the generation system has been completed. The highest-order byte in the first UK register is set to an unused character in the UK index. The remaining bytes in the first UK register can be ignored.

The highest-order byte of any uncompressed key is entered into a UK register with left-side byte alignment in FIG. 1. That is, the first (most significant) byte of the key is entered in the leftmost byte position in the UK register. The remaining bytes of the key follow immediately to the right. Any unused byte position in the UK register to the right of an entered UK may be padded with the lowest character in the collating sequence of the used character set, for example, a zero, blank, or null character, etc. Hence any entered uncompressed key may be variable in length up to the maximum size of its UK register. An Uncompressed Key larger than a UK register is truncated on its low-order side; that is, characters on its left side, which do not fit into the UK register, are discarded. Such truncation does not necessarily affect the compressed key generated therefrom. The truncated UK must still be a unique key.

The last pointer R-N of the input stream may be followed by an End Indication byte (or bytes) to indicate the end of the index.

Step 107 causes an A1 cycle to follow the RL cycle as shown in FIGS. 6A and 6B.

The first CK to be generated will have as its K byte the highest-order byte of the CK and a P of one. This may be done directly, or it may be done indirectly by providing an initial dummy UK. The latter is done in the following.

Then step 108 is executed to fetch the highest-order byte in UK-1, which is a dummy UK having at least an unused character in its highest-order position, which is assumed to be a zero in FIG. 1A. Step 109 follows to initiate an A2 cycle which fetches the highest-order byte in the next UK, UK-2 (the first real UK), for a comparison with highest-order byte of dummy UK-1. Address indexing is performed upon the A1 byte address to fetch the corresponding A2 byte. To do this, the address of the A1 byte (of the first UK) is indexed by the sum of the values in the MUKL and RL registers in order to address the corresponding A2 byte (of the second UK). This is done in FIG. 3B by adder 27a which outputs MUKL and RL sum to an adder 26c, which indexes the A1 address in fetch address counter 26a to obtain the effective address of the comparand A2 byte during the A2 cycle. The fetch address counter 26a in FIG. 3B always maintains the current fetch address, except for the indexed A2 byte address. The A2 effective address on bus 26A from adder 26c addresses the byte to be fetched from buffer 10. Because the output of adder 27a is passed by gate 27b only during the A2 clock cycle, gate 27b provides a zero output to adder 26c, except during an A2 cycle. During cycles other than A2, adder 26c merely transfers the output of fetch address counter 26a to line 26A (address to buffer address bus).

Step 109 exits at A to step 111 in FIG. 10B. Step 111 is executed when the fetch addressed UK byte is passed by gate 32B in FIG. 4 into register 32a. Step 112 tests each A2 byte for an end of index indication. This is done in FIG. 5B by decoder 50 and AND circuit 51b, which set trigger 51a, when an end indication is sensed.

Figure 4:
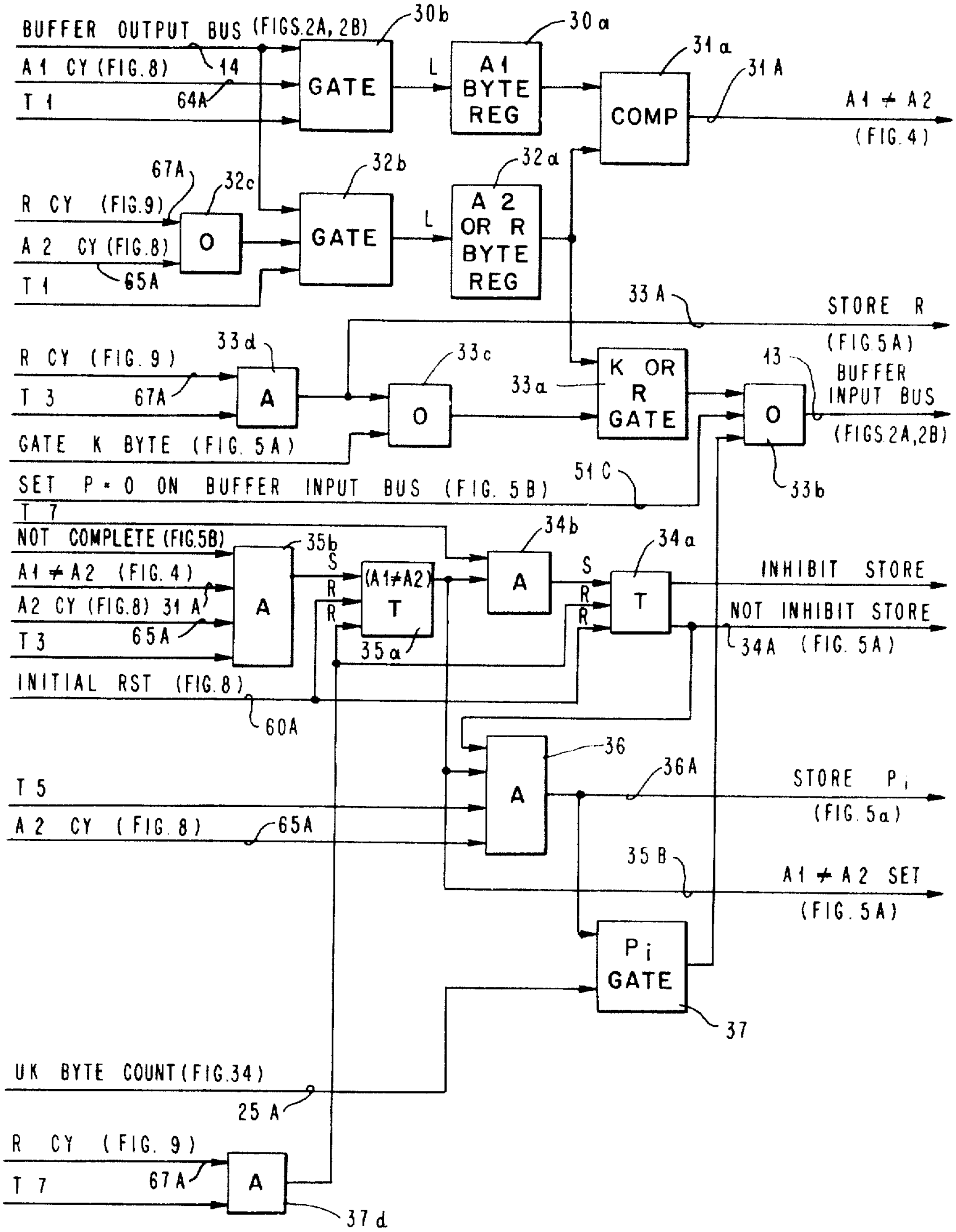

Accordingly the leftmost bytes in registers UK-1 and UK-2 are fetched during the initial A1 and A2 cycles, and they are respectively transferred into the A1 byte register 30a and the A2 byte register 32a in FIG. 4 via the buffer out bus 14 from byte data register 12 in FIG. 2A.

Step 116 is entered when step 112 finds that the current A2 byte does not indicate end of index. Step 116 steps a UK byte counter 25a in FIG. 3A at pulse T1 during each A2 cycle, via AND circuit 24.

Thus counter 25a indicates the current UK byte count from the highest-order UK byte position through the current UK byte position. The UK byte counter 37a is reset to zero by a R cycle following each UK. It is stepped early in a cycle at T1 before the $P_i$ decision is made at T5; hence it indicates the correct UK byte count when a signal is provided on a store $P_i$ line 36A in FIG. 4.

Then step 118 is entered to test the state of an inhibit store trigger 34a in FIG. 4. Trigger 34a is initially put in reset state by a signal on initial reset line 60A. Also trigger 34a is in reset state before the highest-order bytes of any UK pair are compared, due to a reset during the last pointer by a signal from AND circuit 37d. Therefore initially the negative exit is taken to step 119. Trigger 34a is set whenever the bytes in registers 30a and 32a cause comparator 31a to generate a signal on A1≠A2 line 31A, which occurs when the first unequal byte pair is reached in the pair of UK's currently being compared.

With the first UK being a dummy, step 119 finds A1≠A2 trigger 35a in a set state at the first UK byte position. Therefore the first generated CK has a P of one and a K which is the highest-order byte of the second UK, which is the first real byte in memory 10.

An AND circuit 35b is enabled by the A1≠A2 line 31A from comparator 31a to set trigger 35a during T3. At T7 during the same A2 cycle, the A1≠A2 setting of trigger 35a is passed by AND circuit 34b to set inhibit store trigger 34a, which deactivates its not inhibit store line 34A. However at T5 during the same A2 cycle, an AND circuit 36 is enabled by a signal on the A1≠A2 set line 35B from trigger 35a and by the signal on the not inhibit store line 34A, since trigger 34a is not yet set. This enable AND circuit 36 to activate the store $P_i$ line 36A.

Hence step 119 is executed at time T3. Step 122 is entered if A1≠A2 trigger 35a is in set state at T5. Then during the same T5 pulse, an OR circuit 42 passes the signal on the store $P_i$ line 36A to increment a store address counter 41a and to enable a gate 41b to pass the incremented content of counter 41a to buffer address bus 16 via an OR circuit 41c. Counter 41a then addresses the next CK byte location in buffer 10 in FIG. 2B.

Counter 41a is initially reset to byte position two, which represents the byte location in buffer 10 of the RL byte When counter 41a is first incremented, it then addresses the location of the highest-order dummy UK byte in buffer 10 in FIG. 2A Accordingly the first stored $P_i$ byte overlays the highest-order dummy UK Byte, which is no longer needed in buffer 10 and currently exists in A2 byte register 32a in FIG. 4.

At T6 during the same A2 cycle, step 123 is entered to store the current content of the UK byte counter 25a as a $P_i$ byte. Step 123 is executed when the signal from AND circuit 36 enables $P_i$ gate 37 to pass the current setting of UK byte counter 25a from line 25A to the buffer input bus 13, via OR circuit 33b. The $P_i$ byte is then placed in byte data register 12 and stored in buffer 10 in FIG. 2B at the byte location last provided from store address counter 41a.

Figure 5A:
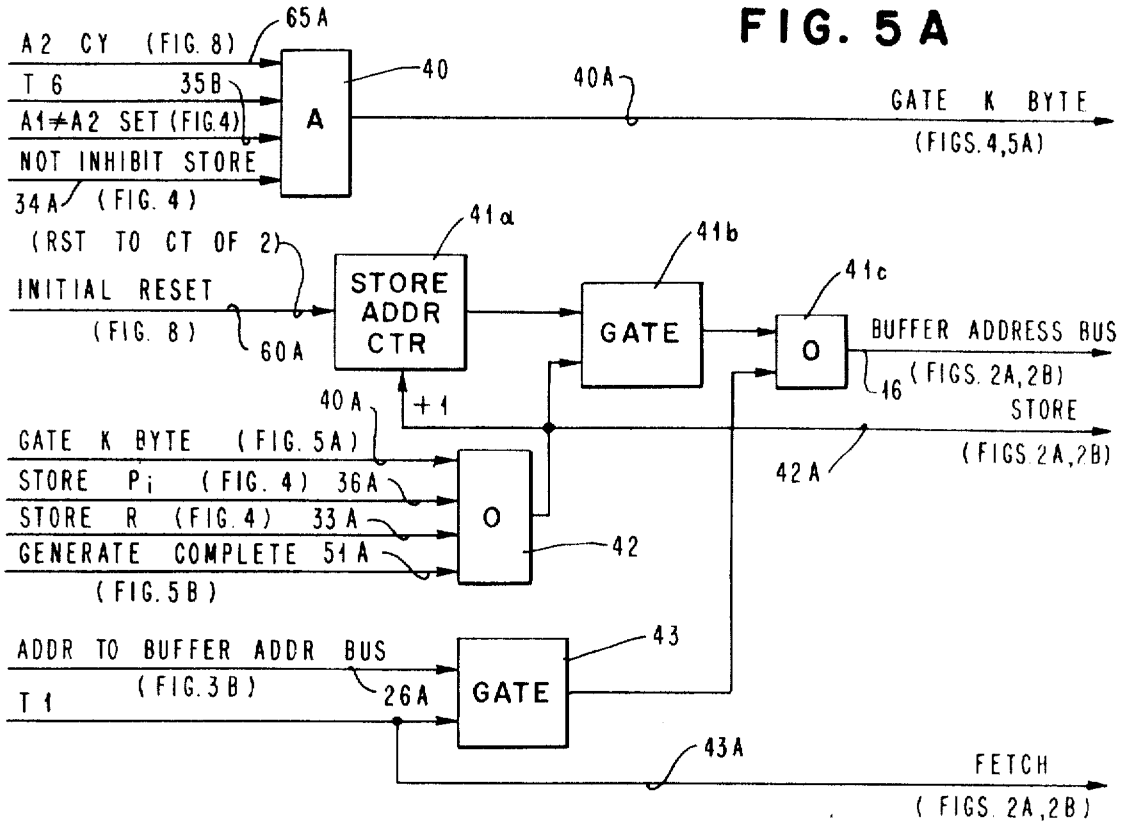
Figure 5B:
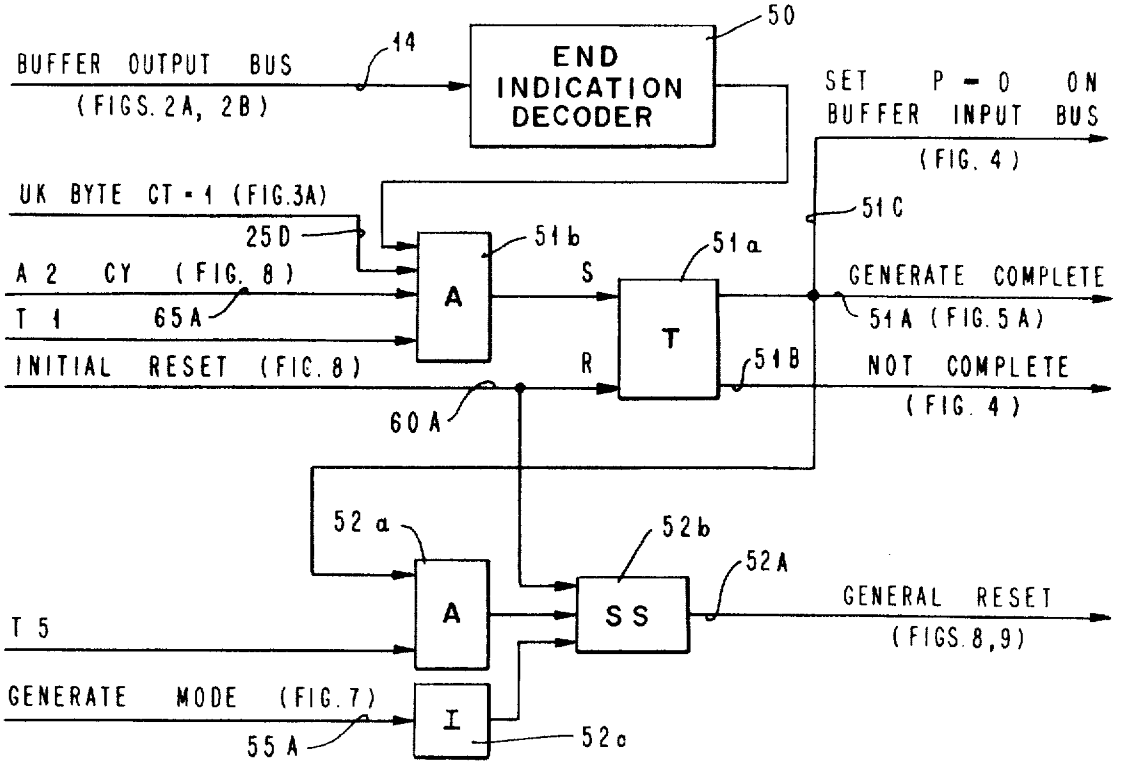

Step 124 is entered at T6 during the same A2 cycle when an AND circuit 40 in FIG. 5A receives the signal on the A1≠A2 set line 35B from trigger 35a and activates a gate K byte line 40A. The gate K byte signal passes through OR circuit 42 to increment store address counter 41a. During this same T6 pulse, the new content of counter 41a is passed to buffer address bus 16 via gate 41b and OR circuit 41c, for addressing the location of the K byte about to be stored in buffer 10 in FIG. 2B.

Then step 125 is executed during the same T6 pulse when the signal on line 40A is passed through OR circuit 33c in FIG. 4 to activate gate 33a, which then passes the K byte from the A2 byte register 32a to buffer input bus 13, from which it is stored in the byte position last addressed by store address counter 41a.

Step 126 is executed at T7 during the same A2 cycle when AND circuit 34b passes the set output of A1≠A2 trigger 35a to set the inhibit store trigger 34a in FIG. 4, so that storing is thereafter inhibited in buffer 10 until trigger 34a is again reset.

Step 127 is executed at the end of the same A2 cycle when the T7 is applied to AND 26b in FIG. 3B to increment the fetch address counter 26a. The new setting of counter 26a is passed to bus 26A to address the next byte in the first UK of the current pair.

Then step 128 is entered to test during each A2 cycle if the current A2 byte is the last byte position in the UK register. If step 128 finds the current A2 byte is not at the last UK register position, exit B2 is taken to FIG. 10A.

After the A1≠A2 signal, the clock controls continue to provide A1 and A2 cycles until UK end is reached, which is signalled by deactivation of a not UK end line 25B derived from comparator 25d in FIG. 3A.

In FIG. 10A, step 107 is entered at B2 to initiate an A1 cycle. This is done at the end of the prior A2 cycle in FIG. 9 by AND circuit 66b which sets trigger 66a with T7 while the not UK end line 25B from FIG. 3A is activated. Each time trigger 66a is set, AND circuit 66c activated at the beginning of the next cycle, (i.e. T0) to provide a signal on A1 Cy–A line 66A. Trigger 64a in FIG. 8 is set by this signal on line 66A to initiate the next A1 cycle.

Step 108 is entered from step 107, and steps 107–109, and 111, 112, 116–118 repeat. But step 118 finds the inhibit store latch set for all UK byte positions following the $P_i$ position. Then step 118 exits to step 127 which steps the fetch address counter 26a in FIG. 3B, and exit B2 is taken from step 128 until the end of the UK pair is reached. Hence steps 107–109, 111, 112, 116, 118, 127 and 128 repeat for every UK byte position until the end of a UK register is signalled by step 128 finding the UK byte counter is equal to the MUKL byte, whereupon it exits at B3. Thus the remainder of the current UK pair is scanned by this recycling. The inhibit store trigger 34a is reset by an R cycle applied to AND circuit 37d when the following pointer is reached.

Whenever step 128 senses the last position in a UK register it exits at B3. Then the UK end line 25A in FIGS. 3A is activated and enables AND circuit 67b to set trigger 67a in FIG. 9 in preparation for the initiation of an R cycle. Then step 131 in FIG. 10C is entered from B3 during the next T0 pulse which enables AND 67c to set the R cycle trigger 67d and begin an R cycle on line 67A.

Step 132 is then entered to load register 32a in FIG. 4 with the first pointer byte when the R cycle signal activates gate 32b via OR circuit 32c. Gate 32b then passes the first pointer byte from buffer output bus 14 into register 32a.

Figure 2B:
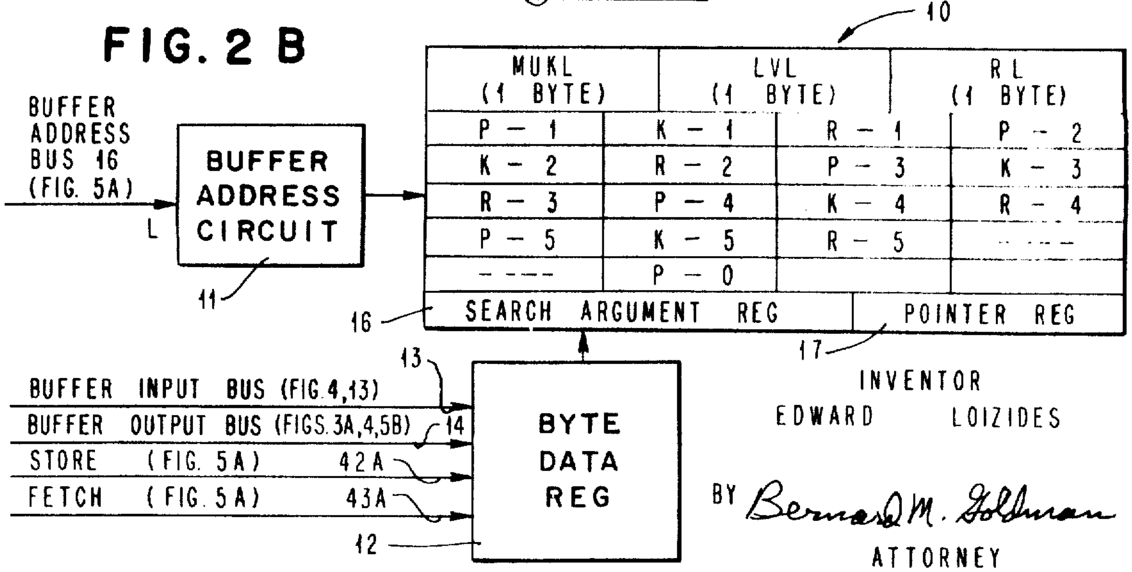

Step 133 acts to step store address counter 41a in FIG. 5A when the store R line 33A from AND circuit 33d signals through OR 42, in order to provide the next store address in buffer 10 in FIG. 2B. Then step 134 transfers the R byte in register 33a through OR circuit 33b to buffer input bus 13, from which it is stored in buffer 10 in the byte location currently addressed by counter 41a.

Step 135 is entered, and an R byte counter 69c in FIG. 9 is incremented at T1 by the R cycle applied to AND circuit 69a.

Step 136 then determines if the current pointer byte is the last for the current pointer. If the pointer field has more than one byte, step 137 is entered, because the R cycle trigger 67d remains set, and next R cycle is initiated. The R bytes continue to be transferred from the buffer output bus 14 to buffer input bus 13 via register 32a, repeating the execution of steps 131–137 until step 136 indicates comparator 69d is signalling that the R byte count in counter 69a has become to equal the value of the RL byte in register 23c in FIG. 3A.

Step 138 is entered from the yes exit from step 136 to step the fetch address counter 26a in FIG. 3B during the T7 pulse of the last R cycle; this addresses the highest-order byte in the next UK, which now becomes the first UK in the next pair. It is also the first real UK in the index, after the first UK pair with the dummy UK has been processed. Step 138 exits at C to FIG. 10A in order to begin generation of the next CK by comparing this next pair of UK's. They will be the second and third UK's in buffer 10 in FIG. 2A, which are the first pair of real UK's in the index.

Step 107 is entered at C when trigger 68a in FIG. 9 is set by AND circuit 68b being activated at T7 during a signal from R end comparator 69d. AAND circuit 68c then provides on the next T0 pulse a signal on the set A1 CY–B line 68A to set trigger 64a in FIG. 8; this begins the first A1 cycle for the new UK pair. Step 108 then transfers the highest-order byte of the first Uk of the new pair into A1 byte register 30a in the manner previously explained. Then step 109 is entered to initiate an A2 cycle in the manner previously explained. Exit A is taken to enter step 111 in FIG. 10B, and the highest-order byte of the second UK of the new pair is transferred into A2 byte register 32a.

Step 112 then exits to step 116, since this A2 byte does not end the index. Step 116 is entered to step the UK byte counter 25a as previously explained.

Step 119 negatively exits to step 120, if it is assumed the highest-order bytes are equal in the A1 and A2 registers, thereby not activating line 31A.

Step 120 is then entered from step 119 to step the fetch address counter 26a in FIG. 3B at the end of the current A2 cycle, and exit B1 is taken back to step 107 in FIG. 10A. After entrance B1 is taken to step 107, a recycling of the last executed steps 107–109, 111, 112, 116–118 occurs for the next highest-order bytes. When step 118 is entered, a decision is made by the A1≠A2 trigger 35a on whether to take the set or reset exit from step 119. When the first pair of unequal A1 and A2 bytes are reached, the set exit from step 119 is taken, and the CK is generated for the current UK pair as steps 122–126 are executed. Thereafter the remaining UK byte positions are scanned by execution of steps 107–109, 111, 112, 116, 118, 127, 128 until exit B3 is taken from step 128 at the end of the current UK pair.

When exit B3 is taken to step 131 in FIG. 10C, the R cycles repeat once per pointer byte to transfer the number of bytes representing the pointer, as determined by the value set into the RL register 23c in FIG. 3A. Comparator 69d receives outputs from the RL Counter and RL Register to provide an equal On RL signal to AND 68b when the last byte of each pointer is fetched.

Then the Clock Controls in FIG. 8 branch to again initiate cycling for the next pair of UK's in buffer 10, which then become $UK_{i+1}$ and $UK_i$. The method then repeats in the manner previously described to generate a next CK.

THis sequence of comparing every next pair of uncompressed keys ($i$–1 and $i$) following each pointer continues until the last UK becomes $UK_{i+1}$ in a current pair. Then step 112 indicates the end of index indication when during the A2 cycle by means of end indication decoder 50 in FIG. 5B. The end indication decoder circuit 50 examines the first byte in the A2 register for the end of index byte coding. When sensed, it signals generate complete on line 51A in FIG. 5B, and signals on set P=0 line 51C. This causes step 112 to take its yes exit to step 113.

Then step 113 is executed when generate complete line 51A increments store address counter 41a, via OR circuit 42, and it also causes gate 41b to pass the new counter setting to buffer address bus 16. Step 114 is next executed when line 51C acts on OR circuit 33b in FIG. 4 to generate an all zero byte, which is provided to buffer input bus 13 for storage at the provided address. Step 115 is entered to end the generation of the Compressed Index upon completion of the pulse from single shot 52*b*, which activated at T5 following the setting of trigger 51*a*.

SEARCH MODE METHOD AND SYSTEM EMBODIMENTS

The search mode receives as its input the index of compressed keys (CK's) obtained from operation of the generate mode of this invention. The disclosed embodiments can search the compressed index whether it resides in memory buffer 10, or on an Input/Output (I/O) device.

Figure 11A:
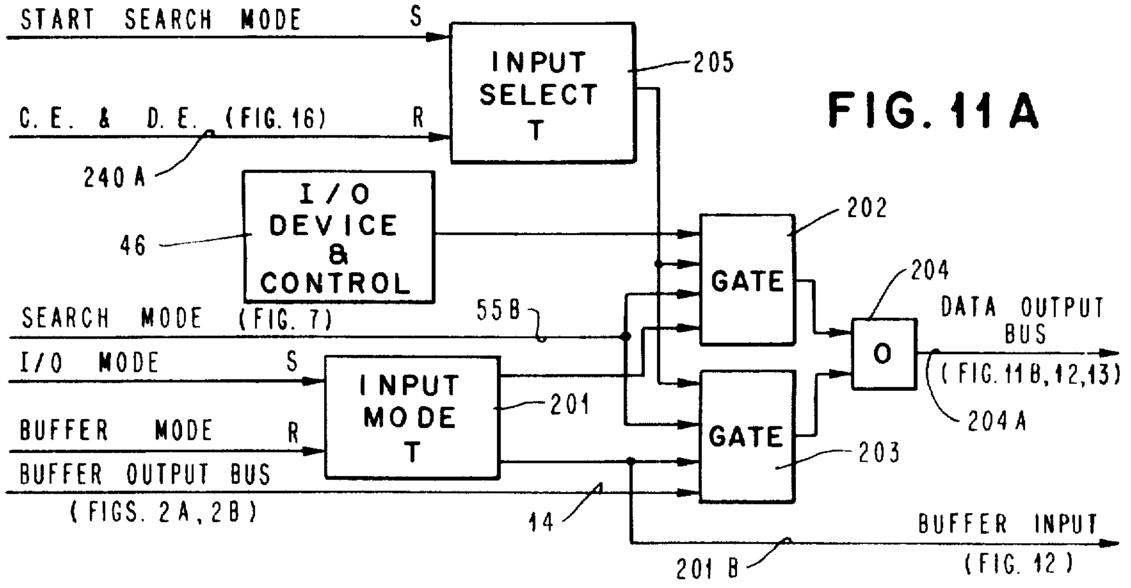

FIG. 11A provides an input mode trigger 201 which indicates whether the input compressed index is on an I/O device 46, or in memory buffer 10. It is set by an I/O mode signal when the input is derived from an I/O device; and it is reset by a buffer mode signal when the compressed index is in buffer 10. These mode signals may be derived from means not a part of this invention, including a manual switch.

After generation, the compressed index may have been written from buffer 10 onto an I/O device by utility programming techniques currently available in the art. Such device may be tape, drum, or disc, etc.; it is represented in FIG. 11A by I/O device and control 46.

In FIG. 11A, gates 202 and 203 pass the CK index bytes under the control of an input select trigger 205.

Trigger 205 is set under CPU control by a start search mode instruction to begin a search operation. Trigger 205 is reset at the end of a search by a device end and channel end (C.E. & D.E.) signal from line 240A.

One embodiment of a method of searching a one key-byte per key compressed index is illustrated in FIGS. 19A–D. The start search-mode instruction signal executes step 301 in FIG. 19A as it is applied to AND circuit 250*c* in FIG. 17 to initiate the search clock controls.

Then initiatization step 302 is executed, which includes resetting all essential triggers and register in the system, and starting the search clock-controls. The initializing cycles from the clock controls, include, MUKL, LVL and RL. The search clock control cycles from FIG. 17 are sequenced as shown in FIG. 18. The operation of the clock controls and these registers is essentially the same as explained in previously cited application Ser. No. 788,876. The inputted flag bytes LVL and RL are transferred by their clock control cycles into registers 209*a* and 210*a* in FIG. 11B. The LVL flag byte must indicate low level for this compression operation to continue, because a low level UK index is inputted for operation of this invention. If desired, the higher levels of a multilevel index may be concurrently constructed using the subject matter of previously cited application Ser. No. 836,930.

Figure 12:
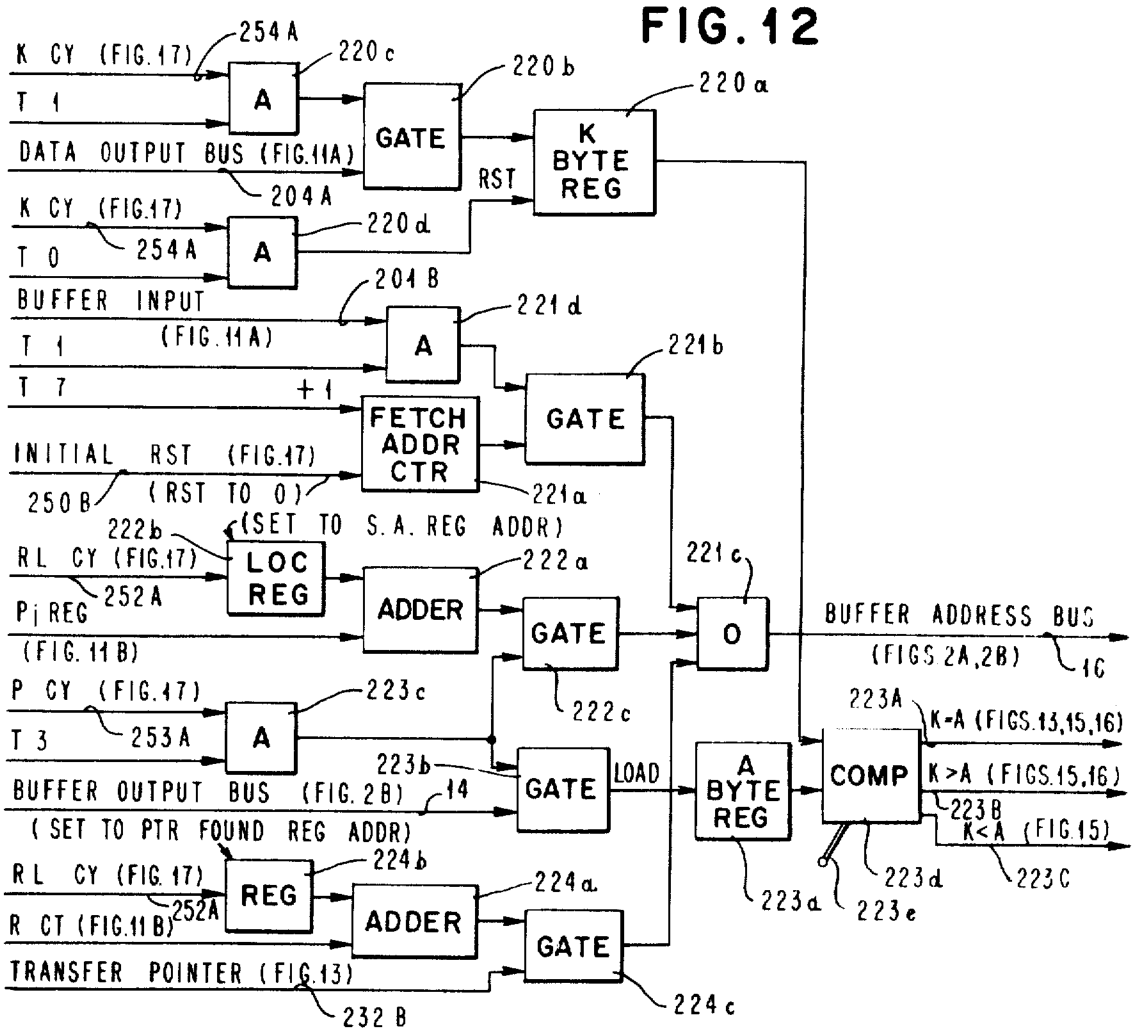

A fetch address counter 221*a* in FIG. 12 is used only when the input is obtained from buffer memory 10, in which case it is incremented to the next byte address at the end (T7) of each clock control cycle. The use of the output of counter 221*a* is controlled by an AND circuit 221*d* which is enabled only when a buffer input signal on line 201B is provided from FIG. 11A. When enabled by AND 221*d*, gate 221*b* passes the counter output to buffer address bus 16 via OR circuit 221C. The timing pulses T0–T7 are obtained from ring 45 which is driven by oscillator 44 in FIG. 7 when buffer 10 is being searched.

If the I/O device input is used, the I/O data is received on data output bus 204A from FIG. 11A. The I/O timing is provided for pulses T0–T7 from the appropriately designated ring 45 in FIG. 7, when switch 47 is positioned to connect the I/O device 46 to AND circuit 49.

Also during initialization step 302, the search argument (S.A.) which is to be searched for in the index is transmitted by a controlling CPU (not shown) to the search argument register 16 shown in FIGS. 2B by means not part of this invention, such as is described in previously cited Ser. No. 836,825. The search argument is transmitted in its entirety to search argument register 16 from which any byte of the S.A. can be randomly fetched for a component search operation. The location of S.A. register 16 is set into a register 222*b* in FIG. 12; it is the address of the highest-order byte of the S.A., and it may be set into register 222*b* during the RL control cycle, but it is not the RL byte.

Figure 19A:
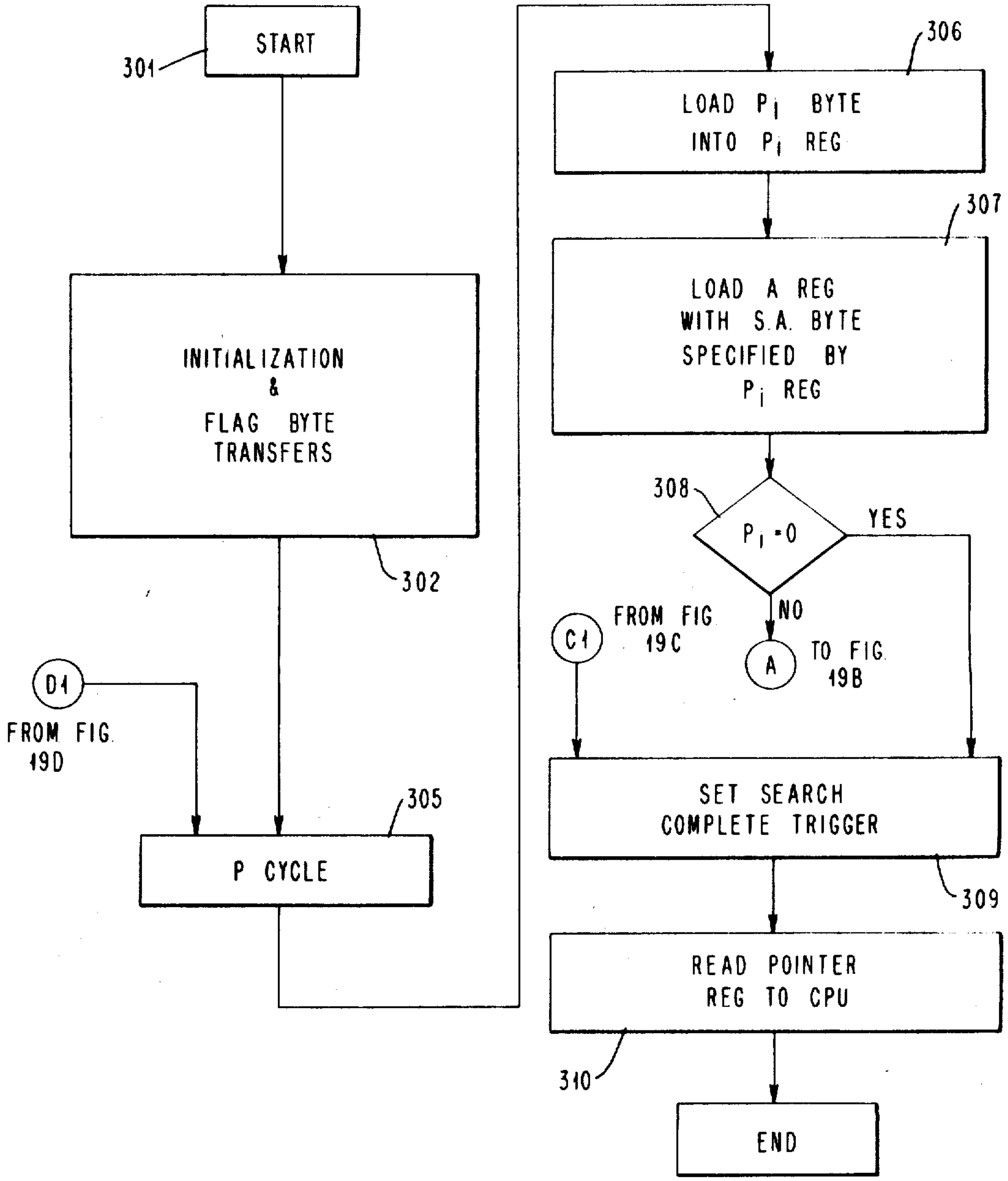

In FIG. 19A, step 305 is entered from step 302 in order to time the input of the first P byte; this is done by a P cycle from the clock control in FIG. 17, which is initiated by the end of the last flag byte cycle.

Step 306 loads the inputted P byte into register 212*a* during this P cycle.

Step 307 loads a selected byte of the S.A. from register 16 into A byte register 223*a* in FIG. 12 during the P cycle, which was initiated by step 305.

The address of the required A byte is generated by an adder 222*a* in FIG. 12 as it receives the current $P_i$. The A byte address is provided from a gate 222*c* when gated by AND 223*c* during each P cycle. Hence during each P cycle at T3, buffer address bus 16 receives an A byte address comprising the sum of the location address in register 222*b* and the current $P_i$ in P register 212*a* in FIG. 11B. The addressed A byte is transferred on buffer output bus 14 via gate 232*b* into A byte register 223*a* in FIG. 12.

Step 308 tests for end of index during each P cycle by inspecting each inputted P for a zero value, which uniquely represents the end of index.

Figure 16:
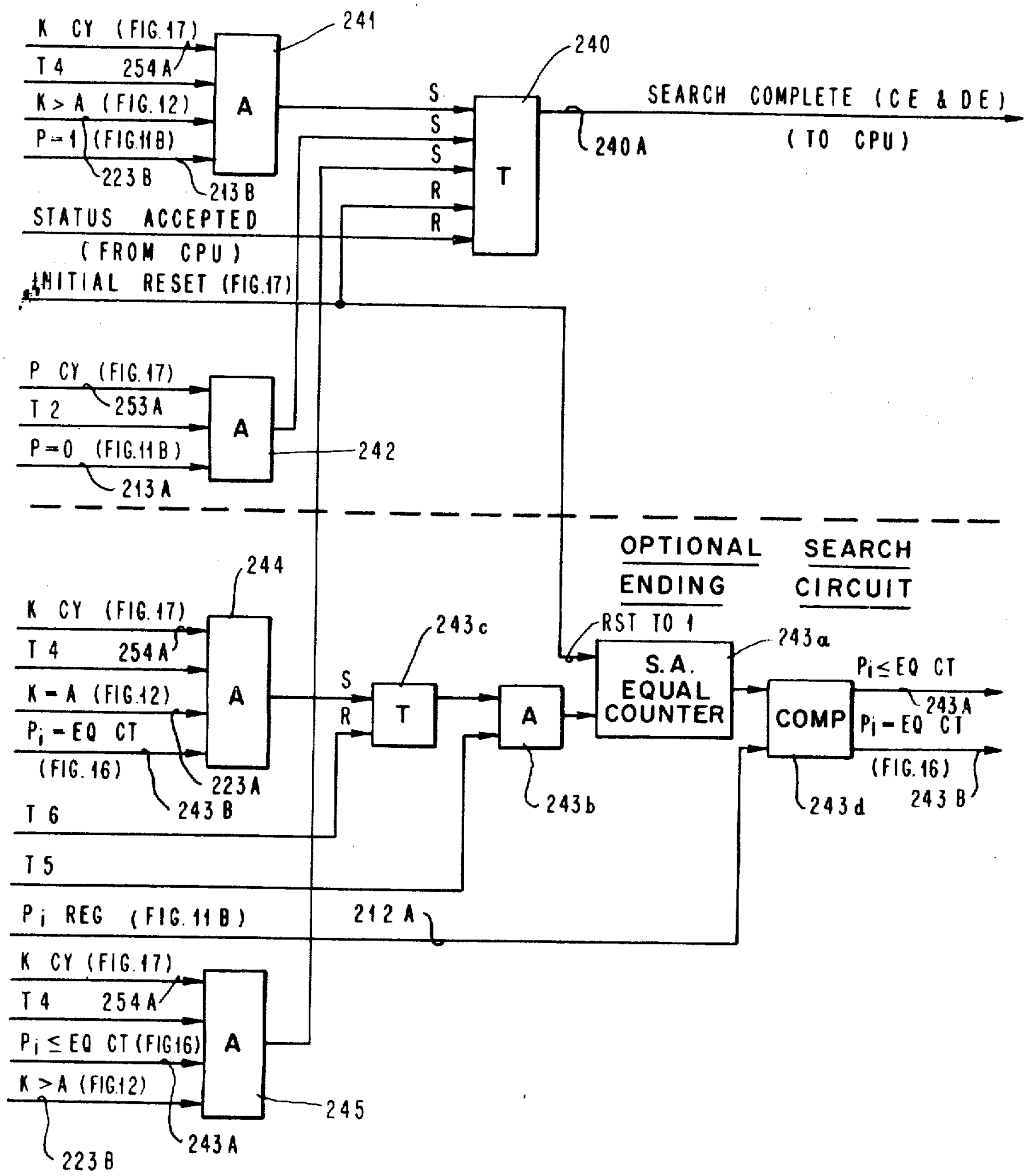

If end of index is sensed, step 309 is entered to set a search complete latch 240 in FIG. 16, which causes the search to end. If P is not zero, the search continues by taking exit A to FIG. 19B.

The search operation requires examining the P byte of every CK, the K bytes of most CK's, and only occasionally the pointer bytes. The CK and pointer bytes are being serially inputted in their generated index order at as fast a rate as the I/O device or buffer is capable of providing. Hence the method disclosed herein does not require close examination of all serially received bytes in the inputted byte stream.

Figure 19B:
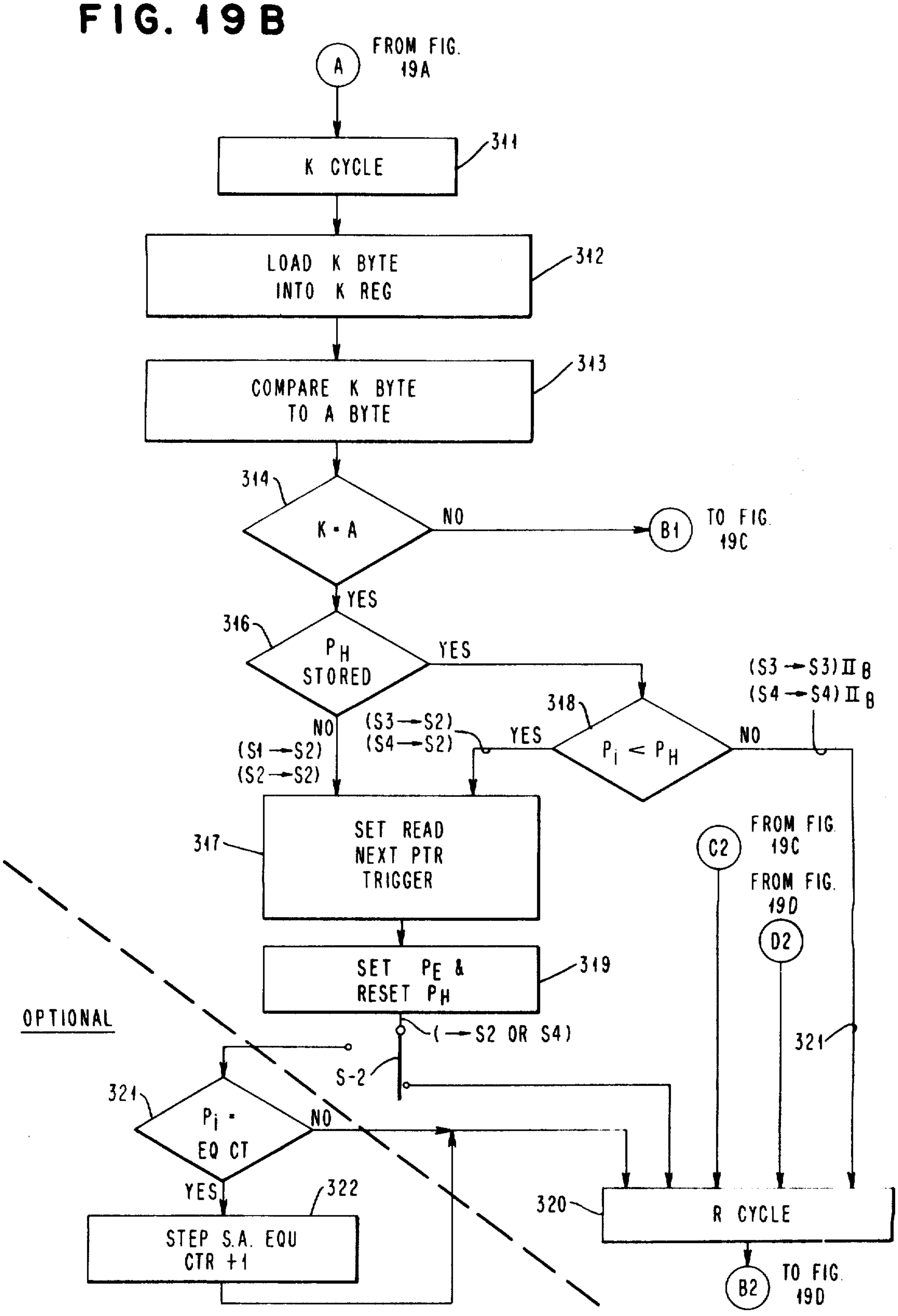

Step 311 in FIG. 19B initiates a K cycle from the clock control in FIG. 17 after each P cycle is completed, as long as step 309 in FIG. 19A has not been entered for ending the search. Step 312 loads the inputted K byte into K register 220*a* in FIG. 12.

Then step 313 compares the K and A bytes currently in registers 220*a* and 223*a* which are directly connected to comparator 223*d*.

Step 314 is executed by a signal from comparator 223*d*, which is the activation of $K=A$ line 223A or not. If not, one of its other output lines is activated, such as $K>A$ line 223B, or $K<A$ line 223C.

If the S.A. was represented in the inputted index, the correct CK will have its $K=A$, and it will be indicated by a timely signal on line 223A in FIG. 12.

However it is likely that other CK's will also generate timely signals on $K=A$ line 223A. More method steps and circuits are provided herein to distinguish the correct CK from incorrect CK's which also have $K=A$. Further essential information is derived from the $K>A$ and $K<A$ signals on lines 223B and 223C from comparator 223*d*. Other information which at times becomes essential to the determination is generated from the $P_i$ values provided by the inputted CK's. The following steps 316–319 may generate information from the current $P_i$, which can later be used in the decision-making part of this method in FIG. 19C.

Figure 14:
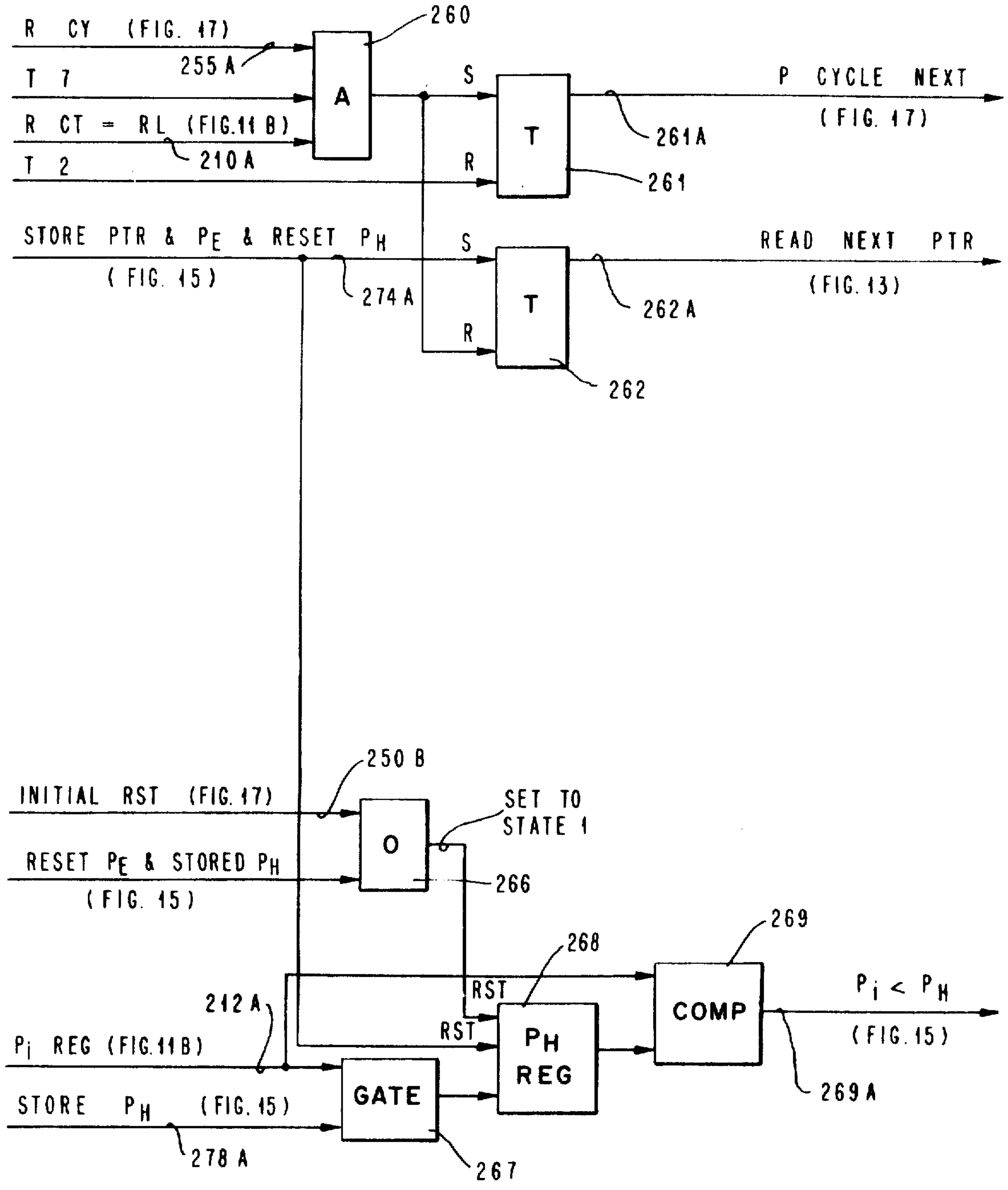
Figure 15:
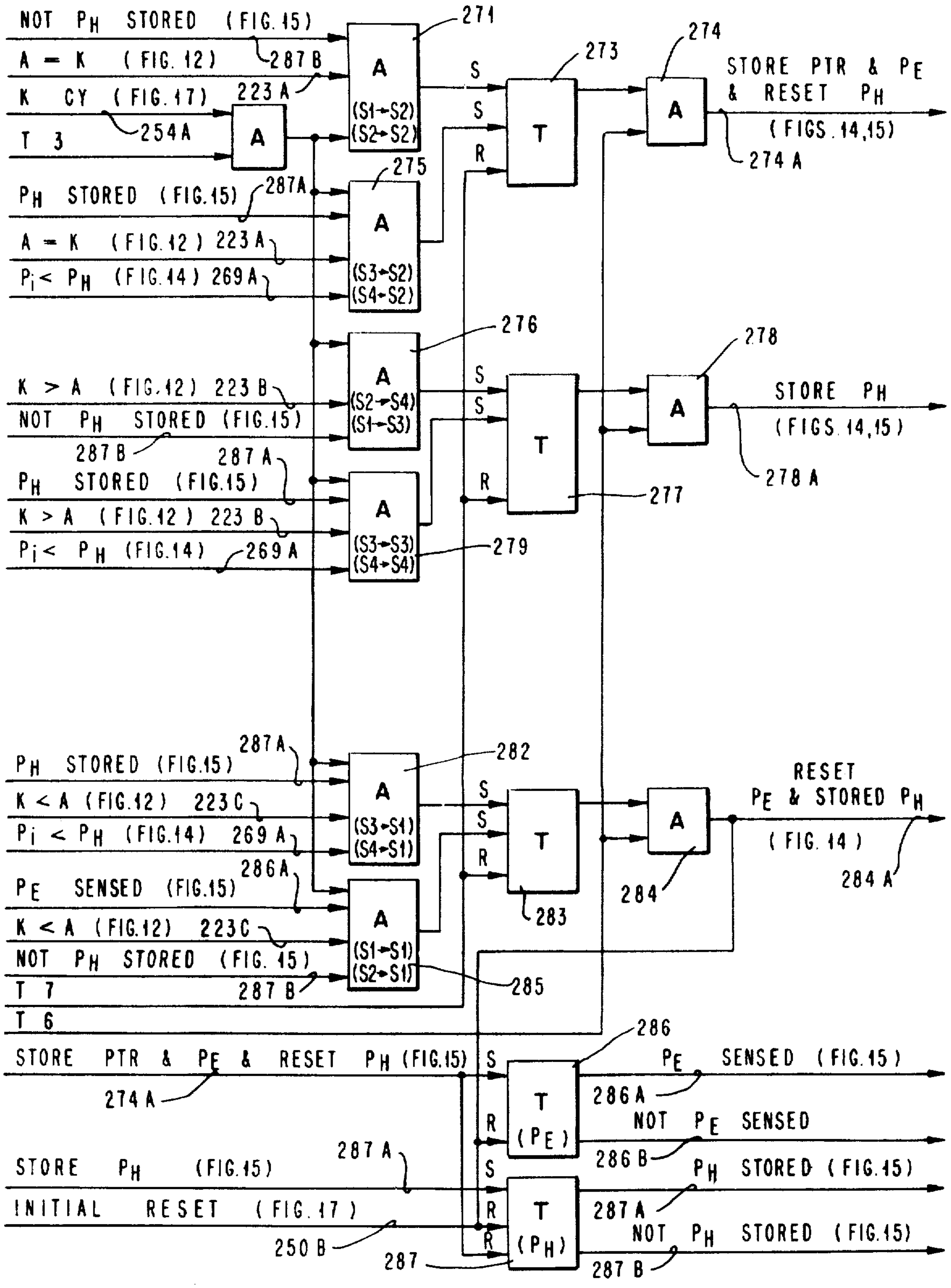

The decisions for determining correct from incorrect CK's having $K=A$ is performed by the hardware represented in FIGS. 14 and 15 which uses the method represented in FIGS. 19B and C. These decisions indicate two types of $P_i$ values, which are designated $P_E$ and $P_H$. They are distinguished by their manner of selection. $P_E$ indicates that a CK has its $K=A$. $P_H$ is the $P_i$ of a selected CK having its $K>A$. Thus only the $P_i$ representing a $P_H$ needs to be stored. The $P_E$ indication may be represented by a single bit (trigger 286) which represents whether the pointer stored in register 17 is valid or not.

A decision to indicate $P_E$ and store the associated pointer is made by AND circuit 271 or 275 setting a trigger 273 in FIG. 15. A decision to store $P_H$ is made by AND circuit 276, or 279 setting a trigger 277. A gate 267 in FIG. 14 transfers the selected $P_H$ for storage in a $P_H$ register 268.

$P_E$ is indicated by AND circuit 274 setting trigger 286 whenever $K=A$ is sensed. Whenever a $P_H$ value is stored in register 268, it indicating trigger 287 is correspondingly set in FIG. 15.

The settings of triggers 286 or 287 indicate four states, which are called state 1, 2, 3 or 4. They are defined by the following table, in which 1 indicates a trigger is set, and 0 indicates a trigger is reset:

STATE TABLE

| State | Settings of: $P_E$ | $P_H$ |
|---|---|---|
| S1 | 0 | 0 |
| S2 | 1 | 0 |
| S3 | 0 | 1 |
| S4 | 1 | 1 |

Whenever $P_E$ or $P_H$ is not longer significant to the decision of which CK is correct, trigger 286 or 287 is respectively reset to cause a change of state. $P_H$ register 268 is reset when $P_H$ indicating trigger 287 is reset.

A nonsignificance determination for $P_E$ and $P_H$ is made by AND circuit 282 or 285 setting a trigger 283 in FIG. 15.

The following SEARCH METHOD SUMMARY relates states S1–S4 to the current P, K, and A values in registers 212a, 220a, and 223a. This SUMMARY also indicates the resulting action, if any is required.

SEARCH METHOD SUMMARY

I. PREREQUISITE: The search argument (S.A.) is identical to one of the UK's in the original UK index from which the compressed index was generated. The CK representing this UK is the correct CK to be found in the index. The correct CK must have $K=A$; but noncorrect CK's may also have $K=A$. The following states 1–4 are generated during searching to distinguish the correct from the incorrect CK's having $K=A$:

II. STATE-1 exists at the beginning of a search, or when the old $P_E$ and $P_H$ are not significant for searching the current CK (i.e. $CK_i$). $P_E$ and $P_H$ are reset to indicate state-1. In state-1, no prior CK could be correct. Then $K_i$ and A are compared with the following result:

- a. If $K_i<A$; the desired key is later in the index. Continue in state-1, and read the next CK.
- b. If $K_i=A$, register the pointer with $CK_i$, and indicate $P_E$ to place the system in state-2. Read the next CK.
- c. If $K>A$, and $CK_i$ is not the first CK. (Then $P_i$ is significant because it represents a nondetermining position in the S.A. All immediately following CK's which have equal bytes at this $P_i$, or greater, likewise cannot include the correct CK.) Store $P_i$ as $P_H$ to place the system in state-3, and read the next CK.
- d. If $K>A$, and $CK_i$ is the first CK in the index, the S.A. is not in the index and is lower than the first key. End the search.

III. STATE-2 exists when a prior CK has $K=A$. Thus state-2 is indicated by $P_E$ but no stored $P_H$. In state-2, the last stored pointer could be the correct one:

- a. $P_i$ is right shift:
  1. If $K_i<A$, then the last stored pointer cannot be the correct one, and $P_E$ is not significant. Reset $P_E$ and state-1 results; read the next CK.
  2. If $K_i=A$, indicate $P_E$, and the old pointer is not significant. Register the pointer with $CK_i$, which is possibly correct. Continue in state-2, and read the next CK.
  3. If $K_i>A$, the last pointer is possible correct. The old $P_E$ is significant, and register $P_i$ as $P_H$ to place the system in state-4. Read the next CK.
- b. $P_i$ is left-shift or no-shift:
  1. if $K_i<A$, then the last stored pointer cannot be correct. Its stored $P_E$ is not significant and is reset; state-1 results. Read next CK.
  2. If $K=A$, then $CK_i$ is possibly correct, and its pointer is registered. Indicate $P_E$, and old pointer is not significant. Remain in state-2 and read the next CK.
  3. If $K_i>A$, then last stored pointer is possibly correct. Register $P_i$ as $P_H$, which places the system in state-4. Read next CK.

IV. STATE-3 exists when a prior CK has stored $P_H$ which may be significant in searching $CK_i$, and $P_E$ is not significant. In state-3, no prior CK can be the correct one:

- a. If $P_i$ is right-shift from $P_H$: ignore high, equal, or low between K and A, and read the next CK in state-3. (This will reject all immediately following CK's having $P>P_H$. The next significant CK to have its K byte examined will have $P\leq P_H$.)
- b. If $P_i$ is left-shift or no-shift from $P_H$:
  1. $K_i<A$ indicates $P_H$ is not significant; reset $P_H$ to change to state-1; and read the next CK.
  2. $K_i=A$ indicates $P_H$ is not significant; and it is reset. Indicate $P_E$, and change to state-2. Register the pointer, and read the next CK.
  3. $K_i>A$ indicates the nonsignificance of old $P_H$. Store $P_i$ as new $P_H$, and stay in state-3. Read the next CK.

V. STATE-4 exists when two prior CK's have indicated $P_E$ and stored $P_H$. The last stored pointer could be correct:

- a. $P_i$ is right shift from $P_H$: The old $P_E$ and $P_H$ are significant. Hence continue state-4 while ignoring any high, equal or low between $K_i$ and A. Read the next CK. (This will reject all immediately following right-shift CK'S.)
- b. $P_i$ is left-shift or no-shift from $P_H$:
  1. $K_i<A$ indicates nonsignificance of old $P_E$ and $P_H$, and they are reset to provide state-1
  2. $K_i=A$ indicates $CK_i$ is possibly correct. Indicate $P_E$, and reset $P_H$ to change to state-2. Register the pointer, and read the next CK.
  3. $K_i>A$ indicates significance of old $P_E$. Store $P_i$ as new $P_H$. Continue in state-4, and read the next CK.

VI. ENDING CONDITION: Whenever $K>A$ occurs during $P_i=1$, the search is ended. Otherwise the search is ended when the end of index is reached. In either case, the correct CK is that CK which last readout a pointer; this pointer is associated with the CK storing the last significant $P_E$. Therefore only state-2 or state-4 can exist when the search is ended for a correct readout. If state-1 or state-3 then exist, the S.A. cannot be in the index and any prior pointer readout is ignored.

VII. ADDITIONAL OPTIONAL ENDING CONDITIONS: A search argument equal counter (S.A. equal counter) may be provided to obtain a search ending before the end of index under the special condition when K is greater than A while $P_i$ is less than or equal to the current setting of the equal counter. The equal counter is incremented only when K is equal to A while $P_i$ is equal to the current setting of the equal counter. Whether this optional ending will act during a search depends on S.A. choice and the shift characteristics of an index.

The preceding SUMMARY is consistent with the rules in TABLE-E, previously stated herein, which gives the relationship rules for bytes having the same order in a sorted uncompressed index.

The preceding SUMMARY is executed by the method shown in FIGS. 19A–D, in relation to the hardware represented in FIGS. 7, 11A–17.

A concise representation of the conditions and actions in the SEARCH METHOD SUMMARY which cause a continuation or a change in the current state upon reading a CK is provided in the following SUMMARY TABLE:

SUMMARY

| | Out S1 | Out S2 | Out S3 | Out S4 |
|---|---|---|---|---|
| IN: S1 | C: (1) K<A, and (2) Any shift. A: None. | C: (1) K=A, and (2) Any shift. A: Store PTR, & indicate $P_E$. | C: (1) K>A, and (2) Any shift. A: Store $P_H$, & indicate $P_H$. | |
| IN: S2 | C: (1) K<A, and (2) Any shift. A: Reset $P_E$. | C: (1) K=A, and (2) Any shift. A: Store PTR, & indicate $P_E$. | | C: (1) K>A, and (2) Any shift. A: Store $P_H$, & indicate $P_H$ (old $P_E$ significant). |
| IN: S3 | C: (1) K<A, and (2) $P_i<P_H$. A: Reset $P_H$. | C: (1) K=A, and (2) $P_i<P_H$. A: Store PTR, & indicate $P_E$. Reset $P_H$. | C: (1) K>A, and (2) $P_i<P_H$. A: Store $P_H$, & indicate $P_H$. <br> C: $P_i \geq P_H$ A: None (ignore K:A; old $P_H$ significant) | |
| IN: S4 | C: (1) K<A, and (2) $P_i<P_H$. A: Reset $P_E$ and $P_H$. | C: (1) K=A, and (2) $P_i<P_H$. A: Store PTR, & indicate $P_E$. Reset $P_H$. | | C: (1) K>A, and (2) $P_i<P_H$. A: Store $P_H$, & indicate $P_H$ (old $P_E$ significant). <br> C: (1) $P_i \geq P_H$ A: None (old $P_E$ and $P_H$ are significant; ignore K:A). |

In the above SUMMARY TABLE, "IN" is an abbreviation for input state, and "OUT" is an abbreviation for output state. The input state S1, S2, S3 or S4 applies to each box in its horizontal row; and the output state S1, S2, S3 or S4 applies to each box in its vertical column. Any box position can be defined by specifying its input state followed by its output state. For example, the box in the upper left-hand corner is (S1→S1), and the box in the lower left-hand corner is (S4→S1). This notation is used in the AND circuits in FIG. 15 to relate a particular AND circuit to one or more boxes in the Table. This same notation is also used in the method in FIGS. 19B and C to tie the steps to the SUMMARY TABLE.

Each box contents gives the conditions (C) found with the currently read CK, and the responsive action (A) to be taken to assure that the specified output state for that box is obtained. The conditions (C) may include low (i.e. $K_i<A$), equal (i.e. $K=A$), or high (i.e. $K>A$), and the relationship between the current P (i.e. $P_i$) and a currently stored $P_E$ and/or $P_H$.

Accordingly, every box has its input state represented to the left of the box; and its output state is indicated vertically above the box which results from the conditions and action stated within the box.

In some boxes, two sets of conditions (C) and actions (A) are represented; they are boxes (S2→S2), (S3→S3) and S4→S4). The bottom half of each of these boxes does not require any new action; that is, the input state of $P_E$ and $P_H$ is also their output state under the conditions (C) defined in the box. Hence no special circuits are needed to represent them.

Some boxes have identical conditions and identical actions; they can be executed by the same circuit in FIG. 15, for example each AND circuit 271, 275, 276, 279, 282, or 285, represents two boxes in the SUMMARY TABLE.

The preceding SEARCH METHOD SUMMARY and MATRIX TABLE should aid an understanding of the method in FIGS. 19B and C, and the related circuits.

Step 316 is entered when step 314 indicates a $K=A$ signal on line 223A. Step 316 represents the output signals on lines 287A and B from $P_H$ indicating trigger 287 in FIG. 15; these output signals on lines 287A and B are dependent on the set or reset state of trigger 287 and indicate whether or not a currently significant $P_H$ value is stored in register 268 in FIG. 14.

When $P_H$ is stored, state S3 or S4 exists, as shown in the preceding STATE TABLE. But if $P_H$ is reset, state S1 or S2 must exist.

Step 317 is entered if $P_H$ is not stored (i.e. a signal is provided on line 287B). Input state S1 or S2 exists, and output state S2 results. Step 317 sets a read next pointer trigger 262 in FIG. 14 to prepare the system for storing the pointer which immediately follows the current K byte and is associated with the current CK, since step 314 has determined this CK has $K=A$.

Step 319 is entered from step 317 to set $P_E$ trigger 286, since the $P_E$ is significant to the next CK.

Then step 320 is entered (when switch S2 is set as shown) to initiate an R cycle, during which the associated pointer, which begins with the next inputted byte, will be stored in pointer register 17 in FIG. 2B, because step 317 had set the read next pointer trigger.

However, step 318 is entered if step 316 finds that $P_H$ was stored (i.e. a signal exists on line 287A). Input state S3 or S4, exists, and output state S2 results. Step 318 determines that the associated pointer will be stored by entering step 317 only under the condition of $P_i<P_H$, in which $P_H$ is the value currently stored in $P_H$ register 268 in FIG. 15.

However, if step 318 finds $P_i \geq P_H$, then step 320 is entered to initiate an R cycle for the pointer which follows next. This will skip the associated pointer since step 317 has been bypassed and the read next pointer trigger has not been set (i.e. it remains in reset state).

It was previously described how the steps at the bottom of FIG. 19B are executed after step 314 finds $K=A$ for the currently inputted CK.

Figure 19C:
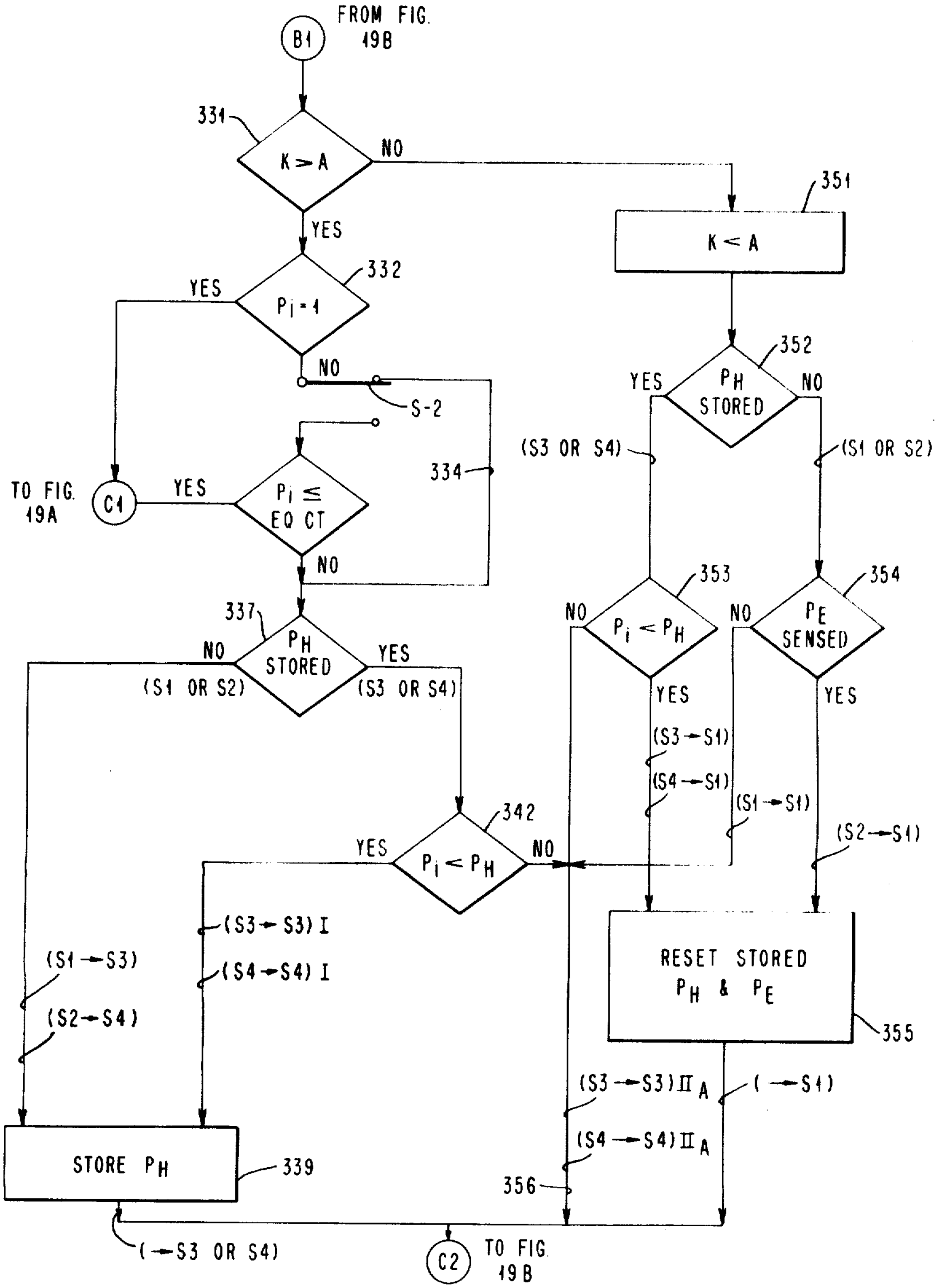

However if step 314 finds K is not equal to A, exit B1 is taken to the method in FIG. 19C, where step 331 is entered to determine if a signal is being provided on $K>A$ line 223B. If not, then step 351 is entered to indicate that a signal must exist on $K<A$ line 223C; the $K<A$ signal must exist by default of neither the $K=A$ or $K>A$ signals existing.

Step 332 is entered if step 331 finds $K>A$. Step 332 tests if $P_i$ is one, which exists in the special case where the current K byte is the highest-order byte in the UK it represents. If $P_i$ is one, and $K_i>A$, then the S.A. must be lower than the UK represented by the current CK; and the search is ended by exiting at C1 from step 332 to step 309 in FIG. 19A. If the current CK is the first in the index, an initial exit to C1 indicates the S.A. is not in the index and is lower than the first key in the index; no pointer can then be stored in pointer register 17. If exit C1 is taken with a CK which is not the first CK in the index, the last pointer stored in pointer register 17 may possibly be the correct pointer if $P_E$ trigger 286 is set. In any case, if no significant pointer is stored in register 17, (i.e. $P_E$ trigger 286 is reset), the S.A. is not in the index.

If $P_i$ is not one, step 337 is entered from step 332 when switch S2 is in the illustrated position. FIGS. 19B and C show two different poles of switch S2, which is used to select (or not select) optional steps which use an S.A. equal counter (EQU CTR) to obtain a sometime quicker ending to the search if certain conditions exist in the construction of the index and in the choice of the S.A. If these conditions do not exist, no advantage is obtained from the equal counter operation. The illustrated position of switch S2 does not select the equal counter option, which is discussed later.

Reference is made to the SUMMARY TABLE, previously given, in explaining the operation of the method in FIGS. 19B and C.

FIG. 19B shows a downward path from step 314 which may be called the $K=A$ path. This path ends at the exit from step 319, which stores $P_E$ so that state S2 results. This path represents the four boxes in the "Out S2" column of the SUMMARY TABLE. Each box in this column includes $K=A$ as one of its conditions (C). Hence the "Out S2" is the output state of this $K=A$ path in FIG. 19B.

Also a passive path is provided from step 318 to step 320 to represent the bottom halves of boxes (S3→S3) and (S4→S4) for the particular situation where $K=A$ in the ignored K to A relationship. The remaining $K>A$ and $K<A$ situations in the ignored K to A relationship are shown in FIG. 19C.

FIG. 19C shows two downward paths from step 331, both of which exit at C2 to FIG. 19B for handling the next following pointer. The two paths may be called the $K>A$ path (on the left), and the $K<A$ path (on the right). The right-hand path ($K<A$) represents the four boxes in the "Out S1" column of the SUMMARY TABLE, each including the condition (C) of $K<A$. The right-hand path exits to C2 from step 355 which resets any stored $P_H$ and $P_E$, which assures that state S1 results as is defined in the preceding STATE TABLE. Hence the "Out S1" is the output of the right-hand path.

Similarly the left-hand path ($K>A$) represents the four boxes in the "Out S3" and "Out S4" columns of the SUMMARY TABLE. The left-hand path exits to C2 from step 339 which stores $P_H$, so that state S3 or S4 results, depending on whether the input state of $P_E$ is reset or contains a prior P. Hence "Out S3" or "Out S4" is the output of the left-hand path in FIG. 19C.

In each of the three paths described in FIGS. 19B and C, a positive action results in exiting from each respective path, i.e. from steps 319, 339 and 355. However, each of these three paths also has a splitoff path in which no positive action is to be taken, in order to reach a correct decision, i.e. the input indications of $P_E$ and $P_H$ are retained as output indications. The splitoff path from step 318 to step 320 in FIG. 19B was previously mentioned. The splitoff paths essentially represent the boxes (or box halves) in the matrix table which have "none" after action (A); they are boxes (S1→S1), (S2→S2), (S3→S3), and (S4→S4). The designator II in FIGS. 19B and C indicates the lower half of the respective box involved. A subscript A or B indicates only a part of that box function is performed by the respective splitoff path; for example, (S→S3)II and (S4→S4)II each ignore the comparison between K and A and hence apply whether $k=A$, $K>A$ or $K<A$. Thus the path between steps 318 and 320 obtains only the component B of (S3→S3)II and (S4→S4)II which occurs when $K=A$. The splitoff exit path 356 in FIG. 19C supplies their remaining components A from step 342 when $K>A$ for no-action boxes (S3→S3) and (S4→S4). Path 356 also provides no-action box (S1→S1) from step 354.

Near the beginning of either of the left-hand or right-hand path in FIG. 19C, the input $P_H$ stored condition is examined by step 337 or 352 as an initial step in determining the correct action. The negative exit from either step defines S1 or S2 as the input state; while the positive exit from either step defines S3 or S4 as the input state.

Either step 337 or 352 is executed by examining the current signals on the output lines 287A and 287B of $P_H$ stored trigger 287.

In each path an identical step 342 or 353 is entered from the positive exit of the $P_H$ stored step. Steps 342 and 353 are executed by an output signal, or a lack of output signal, from comparator 269 on line 269A.

In the right-hand path in FIG. 19C, 354 is entered from the negative exit of the $P_H$ stored step 352. Step 354 is executed by the output signal from trigger 286 on lines 286A and 286B.

Step 355 is entered from the positive exit of either step 353 or 354, and step 355 is executed by resetting both of the $P_E$ and $P_H$ triggers 286 and 287, and by resetting $P_H$ register 268.

In FIG. 15, AND circuit 282 performs the connected steps 351, 352, 353 and 355 to set trigger 283 and cause a signal on line 284A; this also executes boxes (S3→S1) and (S4→S1) in the SUMMARY TABLE. Likewise in FIG. 15, AND circuit 285 performs the connected steps 351, 352, 354 and 355 to generate a signal on line 284A, which resets triggers 286 and 287, and register 268 to the required S1 state; this executes boxes (S1→S1), and (S2→S1) in the SUMMARY TABLE. The negative exits from steps 353 and 354 provide the previously mentioned splitoff paths, which do not require any action, and they are represented by the nonsignalling of lines 274A, 278A and 284A.

In the left-hand path in FIG. 19C, the negative exit from step 337 enters step 339 to execute boxes (S2→S4) and (S1→S3). The combination of steps 331, 332, and 337 are executed by AND circuit 276 in FIG. 15 in combination with nonactuation of AND circuit 241 in FIG. 16. Actuation of AND circuit 241 overrides any operation of AND 276 to obtain the exit at C1.

Finally activation of AND circuit 279 in combination with nonactivation of AND 241 executes steps 331, 332, 337, 342 and 339 along their connected path, this executes the upper half of each box (S3→S3) and (S4→S4). As previously mentioned, the negative exit from step 342 does not result in any action, and its operation is represented by the nonsignalling of lines 274A, 278A and 284A.

Exit C2 enters step 320 in FIG. 19B which initiates an R cycle for handing an inputted pointer. It then exits to FIG. 19D.

Figure 19D:
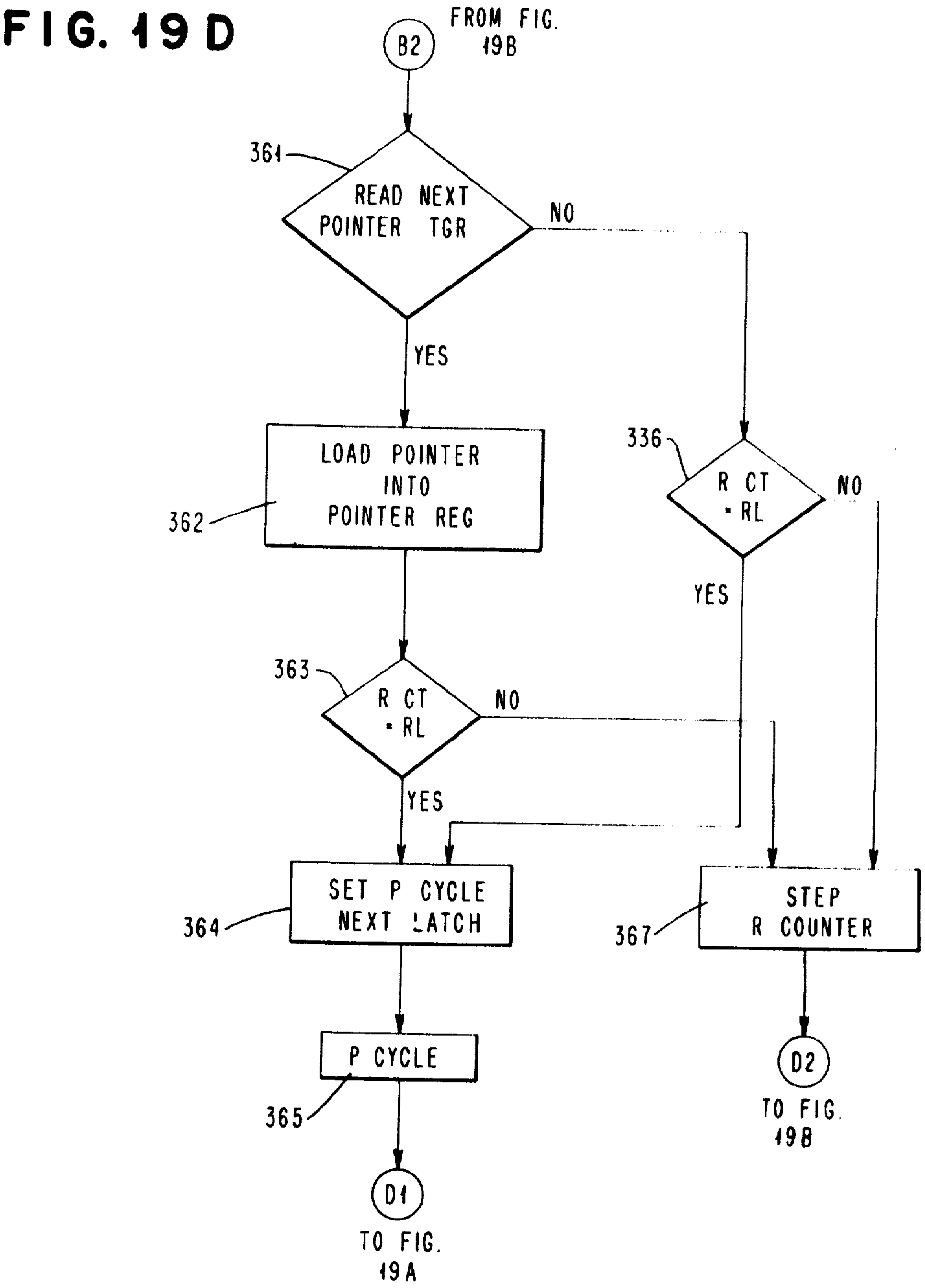

The method in FIG. 19D controls the scanning and readout handling of the pointer with each CK. Any action which causes entry of R cycle step 320 in FIG. 19B results in exiting at B2 to FIG. 19D. All input pointers are scanned with R cycles. However only input pointers with CK's meeting the $K=A$ and other conditions are stored into pointer register 17 in FIG. 2B.

The contents of a register 224*b* in FIG. 12 locate pointer register 17 within buffer 10 in FIG. 2B. Register 224*b* is loaded during the RL flag cycle with the location of register 17, which is the address of its highest-order byte. Thereafter each required pointer byte address is the sum from Adder 224*a* of the address in register 224*b* and the current value an R counter 211*a* in FIG. 11B. The pointer addresses are only required when the read next pointer trigger 262 in FIG. 14 is set. When required, the pointer address is transferred by gate 224*c* to buffer address bus 16 to locate and store the currently inputted pointer bytes into the pointer register 16 as they are passed from data output bus 204A in FIG. 13 through AND circuit 232*b*, pointer byte register 232*a*, and gate 232*c* to the buffer input bus 13.

The inputted pointer is transferred to pointer register 17 when its associated CK has its K byte equal to the currently fetched A byte, with other conditions shown in the preceding SUMMARY TABLE. The associated $K=A$ signal is generated by comparator 223*d* in FIG. 12 when it received the K byte from register 220*a* and the equal A byte from register 223*a*.

Thus in FIG. 19D, step 361 is entered to determine whether the inputted pointer is to be skipped or whether it is to be readout to pointer register 17. This is determined by whether or not the read next pointer trigger 262 in FIG. 14 is set. This decision was made in FIG. 15 by either AND circuit 271 or 275 setting trigger 273. The condition when the associated $K=A$ exists and no pointer is transferred to register 17 is when $P_i \geq P_H$: these are following CK's with their K byte at an equal or lower-order position than the stored $P_H$.

Figure 11B:
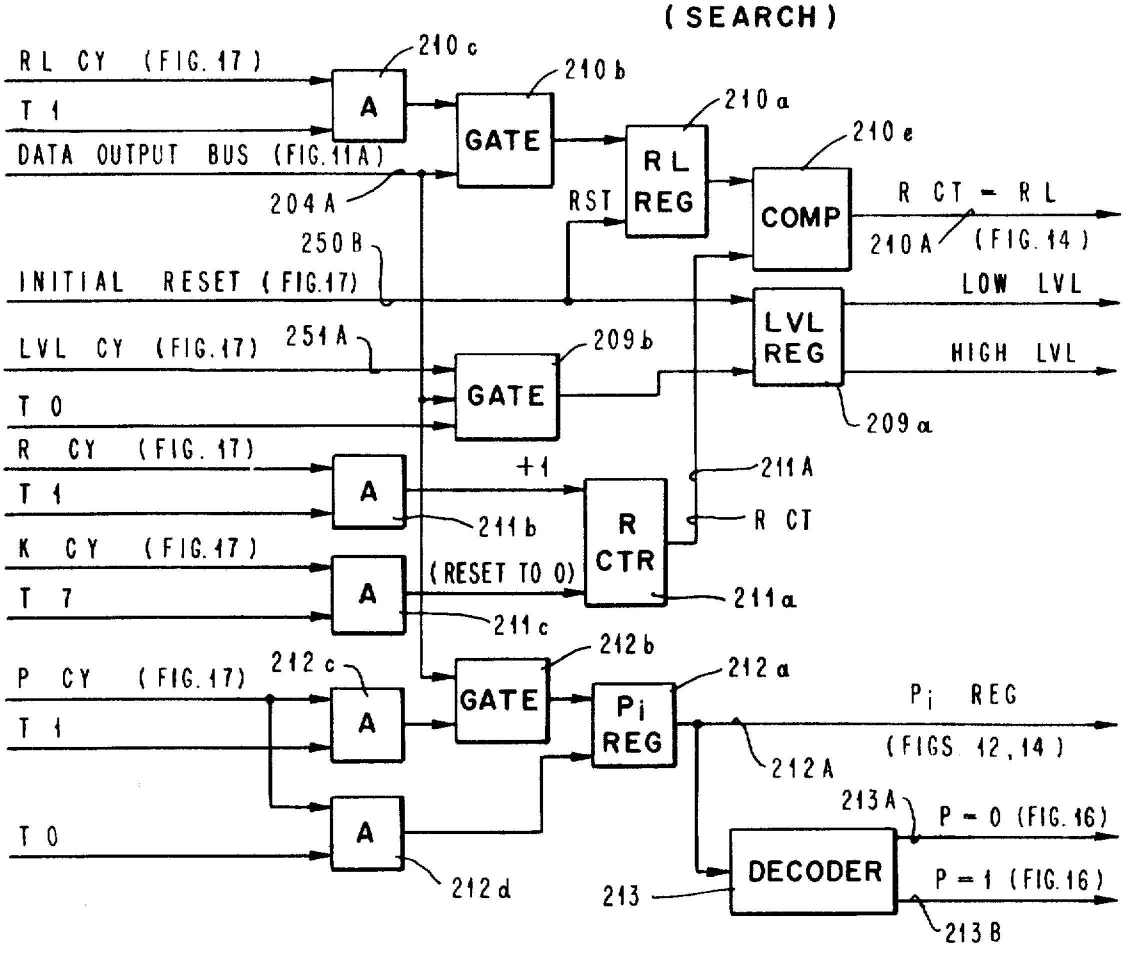
Figure 13:
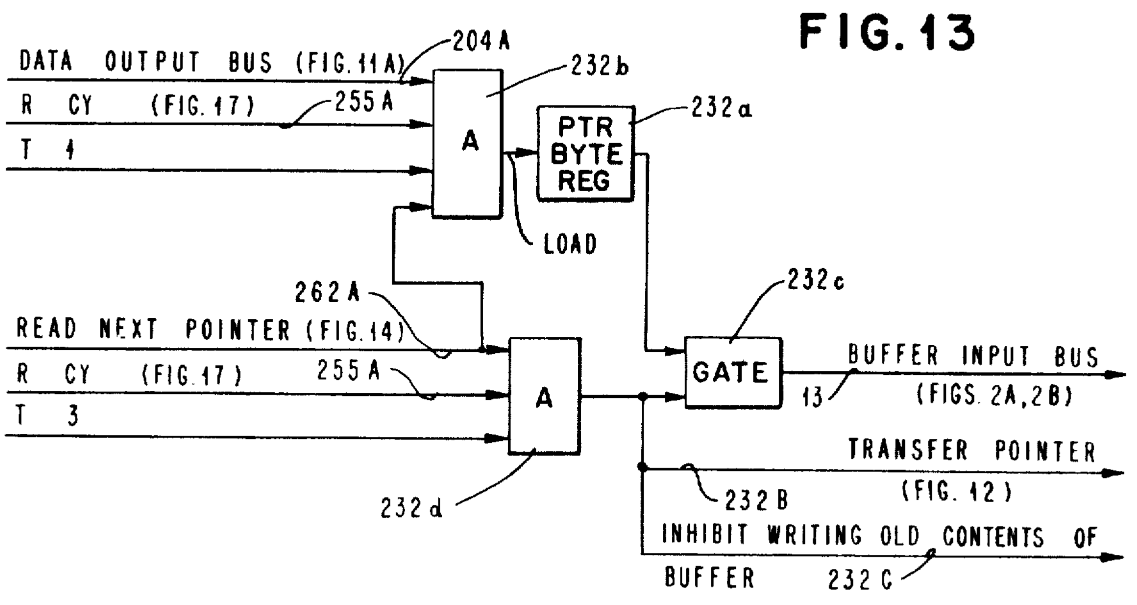

If step 361 in FIG. 19D finds the next pointer trigger is not set, AND 232*d* in FIG. 13 is not activated. Then gate 224*c* does not transfer any address to the buffer address bus 16, nor does gate 232C transfer any of the inputted pointer bytes to the buffer input bus. Hence these pointer bytes are skipped. Accordingly step 366 is entered from step 361. If R $CT=RL$ line 201A in FIG. 11B is not active, the negative exit is taken from step 366 to step 367, which steps the R counter 211*a* in FIG. 11B. R counter 211*a* is reset by the previous K cycle via AND 211*c*, and it counts all R cycles for the current pointer via AND 211*b*.

Step 367 exits at D2 to step 320 in FIG. 19B to initiate the next R cycle. Step 320 exits at B2 back to step 361 in FIG. 19D, and step 366 is entered as long as R *CT=RL* line 210A is not activated. Hence step 367 is entered during each R cycle until step 366 indicates the end of the pointer has been reached, i.e. an R *CT=RL* signal is provided from line 210A during the last R cycle.

The R *CT=RL* signal is generated by a comparator 210*e* in FIG. 11B, which receives the R cycle count from counter 211*a* and compares it to the pointer-length value (RL) in the RL register 210*a*. The R *CT=RL* signal on line 210A is provided to AND circuit 260 in FIG. 14 during the last R cycle for each pointer; this enters step 364 in FIG. 19D to set a P cycle next trigger 261 and provide a signal on line 261A to AND circuit 253*e* in FIG. 17, which initiates a P cycle during the next clock control cycle. The output of AND circuit 260 also resets the read next pointer trigger 262, even though it may already be in reset state. Step 365 follows to initiate the P cycle for the next CK.

If step 361 finds the read next pointer trigger is set, step 362 is entered to load the pointer into pointer register 17, Step 363 is entered after each pointer byte is transferred into register 17. If step 363 does not find an R *CT=RL* signal on line 210A, step 367 is entered, the R counter 211*a* in FIG. 11B is stepped, and the exit D2 is taken to step 320 in FIG. 19B, representing the next R cycle. Then step 320 exits at B2 back to step 361, from which step 362 is entered to store the next pointer byte into register 16. The feedback cycling continues until step 363 detects the end of the pointer. Then steps 364 and 365 are entered. Exit D1 is then taken from FIG. 19D to step 305 in FIG. 19A for processing the next CK in a similar manner. This continues with each subsequent CK until step 309 is entered. Then step 310 reads the stored pointer to the CPU as the correct pointer, and the search is ended for the S.A. currently in S.A. register 16 in FIG. 2B.

SEARCHING DESCENDING INDEXES

The above described embodiments are arranged to search an ascending index; that is, where the compressed index is generated from a UK sequence collated in ascending order.

However the CK generation embodiments previously described herein generate a descending CK index when the inputted UK sequence is collated in descending order. This is because the generation operation only looks for byte inequality, and relies upon, but does not operate upon, the sorted order which is inputted. A sequence check of well-known type can easily be added if required.

The following simple modifications may be provided to have the disclosed embodiments search a descending-collated CK index: Reverse lines 223B and 223C in FIG. 15 and 16. That is, replace the $K>A$ line 223B to AND circuits 276, 279, 241 and 245 with the $K<A$ line 223C from comparator 223*d*. AND, replace the $K<A$ line 223C to AND circuits 282 and 285 with the $K>A$line 223B from comparator 223*d*. Also change the labeling accordingly on the input lines to these AND circuits; and change the labeling of $P_H$ to $P_L$ in FIGS. 14 and 15, (i.e. H meaning high, and L meaning low).

All above circuit changes can be accomplished by adding a double-pole double-throw switch (not shown) within comparator 223*d* for reversing its output lines 223B and 223C. This line-reversal switch internal to comparator 223*d* has its two setting controlled by a toggle 223*e* in FIG. 13. One position of the toggle provides the illustrated line connections and sets the system for ascending indexes. The other toggle position reverses lines 223B and C to the system for descending indexes.

The slight modifications to the method FIGS. 19B and C for a descending-collated index similarly are: Reverse $K>A$ and $K<A$: and replace $P_H$ with $P_L$. That is, replace $P_H$ with $P_L$ in steps 316, 318, 319, 337, 342, 352, 353, 354, and 355. Also in step 331 substitute $K<A$ for $K>A$; and in step 351 substitute $K>A$ for $K<A$.

EQUAL COUNTER OPTION

An optional special ending is provided herein with the use of an S.A. equal counter. This ending occurs whenever the current CK has its $P_i$ equal to or less than the current setting of an S.A. equal counter. This is a special search ending condition because the correct CK in a one K byte index can have a $P_i$ greater than the current setting of the equal counter.

The equal counter's usefulness is primarily determined by the form of the index and the position of the S.A. in the index. It is useful where before the correct CK is reached, the index has CK's with $P_i$'s that cover all high-order byte positions at least through the $P_i$ of the correct CK. The latter index characteristic is found in a tightly packed index, and it is likely to occur in a very large index. It is never an assured characteristic unless a special effect is made to insert dummy CK's with the missing $P_i$'s, and a K byte which properly fits into the collated index, unless the $P_i$ values are initially measured to be naturally contiguous and sufficient.

Thus the equal counter is not useful where no CK has a $P_i$ of two. In general, the probability of equal-counter usefulness increases as the $P_i$ hiatus occurs at increasingly lower-ordered byte positions, i.e. third, fourth, fifth, etc. The index represented in the preceding TABLE-D has a hiatus at a P of two; an equal counter therefore is not effective with this index representation in ending a search.

In FIG. 16, the S.A. equal counter 243*a* is initially set to one. It is incremented by means of AND circuit 244 only by (1) a CK having its $P_i$ equal to the current setting (EQ CT) of the equal counter, and (2) that CK has it $K=A$. Since $P_i$ can jump arbitrarily among sequential Ck's, and the A byte is at the $P_i$ byte position in the S.A., there is no assurance of the prior CK's meeting the incrementing conditions of the equal counter when the correct CK is read. But in those special cases where the equal counter conditions are met, it is useful in ending the search before the end of index is reached, and a saving occurs in search time.

The optional S.A. method steps are shown in FIGS. 19B and 19C, in which switch S2 needs to have its two poles moved from its illustrated position to its other position. In FIG. 19B, step 321 is then entered from step 319 to determine if a $P_i=EQ$ CT signal exists currently on line 343B from comparator 243*d* in FIG. 16. Step 319 is entered only if step 314 had previously determined that $K=A$ for the current K and A bytes.

If step 321 does not find a $P_i=EQ$ CT signal, nothing happens, and step 320 is entered for processing the pointer which begins with the next inputted byte.

However if step 321 finds a $P_i=EQ$ CT signal, step 322 is entered and the equal counter is incremented by one by AND circuit 244. The equal counter cannot end the search during this CK, but it might end the search during the next CK if proper conditions exits.

In FIG. 19C, step 336 represents the search ending conditions for the equal counter. Step 336 is entered after step 331 finds a $K>A$ signal existing for the current CK. Step 336 ends the search if a $P_i \leq EQ$ CT signal exists on line 243A by existing at C1 to step 309 in FIG. 19A to set the search complete trigger. AND circuit 245 in FIG. 16 executes steps 331, 336 and 309.

If $P_i$ is greater than the current equal counter setting, step 336 exits to step 337 to determine conditions needed for continuing the search without the aid of the equal counter.

SEARCH EXAMPLE

An example of a search using this invention may be given with the use of preceding TABLE D while applying the rules of the SUMMARY TABLE and of the SAME-ORDER RELATIONSHIP TABLE-E.

Assume in this example that the result of the search will find the search argument (S.A.) equal to the UH having sequence number 26 in TABLE D, i.e. UK-26. Each CK in the index is referenced by the corresponding UK sequence number; and it, has the P value in the P column, and the single K byte in the corresponding UK.

Initially the method and system are in state-1, since no $P_E$ or $P_H$ can exist when a search is started. Hence $P_E$ and $P_H$ are each initially reset.

The search begins with CK-0, and an equal condition is found between the first K and the highest-order S.A. byte, since $P=1$ for the first CK. $P_E$ is set to one, and the pointer R-0 is therefore stored into pointer register 17 in FIG. 2B. $P_H$ remains reset, and state-2 is the output state. If an S.A. equal counter is being used, it is incremented to two from its reset value of one.

Then CK-1 is read with the input state-2. $P_i$ is five, and it has no relationship to the fifth byte of the S.A. (i.e. UK-26), since N bytes intervene in that column, (i.e. in UK-9 through UK-14). Therefore $K_i$ can be low, equal, or high with respect to the fifth S.A. byte. If $K_i$ is low, state-1 is outputted; and UK-1 cannot appear correct. If $K_i$ is equal, state-2 is outputted; and UK-1 may be correct; hence $P_E$ is set, and R-1 is stored in pointer register 17, overlaying R-0 which then can no longer possibly be correct. If $K_i$ is high, state-4 is outputted, and $P_H$ is set to five, with $P_E$ remaining set.

Next CK-2 is read. The input state can be any of S1, S2, S4. If input states S1 or S2 exit, any output state may occur, depending on whether K is low, equal or high with respect to A. $P_i$ is seven, If input S4 exists $P_i>P_H$, and output state S4 is provided, whether K is low, equal or high. Any of nine boxes in the SUMMARY TABLE may be applicable. None can end the search. At most, pointer R-2 is stored. The output state is any of S1, S2, S3 or S4.

Similarly the following CK-3 through CK-8 will at most store their respective pointer, and the output state is any of S1, S2, S3 or S4.

When CK-9 is reached, it has a P of three, and it must signal $K<A$, since only B's intervene. It also will signal $P_i<P_H$, unless $P_H$ was reset. State-1 is outputted and any inputted $P_E$ and $P_H$ are now reset; any prior $P_H$ value or $P_E$ indication now has no significance, and no pointer stored in register 17 can now be correct.

Likewise CK-10 through CK-13 find the same situation as CK-9, and each outputs state-1.

CK-14 finds $K=A$, stores pointer R-14 and sets $P_E$.

CK-15 a P of seven, and its K has no relationship to the seventh A byte due to the intervention of N bytes in the same column for UK's 16, 18, 19 and 20. Therefore the K byte of CK-15 can be low, equal or high compared to the seventh A byte. Hence the output state can be any of S1, S2 or S4. At most pointer R-15 is stored with $P_E$ set for state-2, or $P_H$ may be set and stored with seven for state-4.

Then CK-16 is read. Its P is 5, and its $K_i$ must be equal with respect to the fifth A byte, since only B's intervene. Then output state-2 results, pointer R-15 is stored, $P_E$ is set, and any prior $P_H$ is reset.

CK-17 has a $P_i$ of nine, and be low, equal or high with respect to a nonrelated A byte. The output state is S1, S2, or S4. At most pointer R-17 is stored.

Next CK-18 through CK-19 have a $P_i$ of six with $K<A$. State-1 results from each of these CK's and $P_E$ and $P_H$ are reset. CK-20 has $K=A$; hence R-20 is stored, and $P_E$ is set.

C-21 next provides a P of 10, and it's K may be low, equal or high without relationship to the N byte in UK-26 (i.e. tenth position of the S.A.). Hence the output state is any of S1, S2, or S4. The pointer with CK-21 may also be arbitrarily stored.

CK-22 through CK-25 (like CK-21) have no relationship between $K_i$ and A, which may be low, equal or high, since the A byte represents an N byte in UK-26 (i.e. the S.A.). Any output state S1, S2, S3, or S4 may result. At most, any of pointers R-22 through R-25 is stored.

When CK-26 is read, its $K=A$. If any $P_H$ is reset, $P_E$ is set to seven, and pointer R-26 is stored in register 17 where it overlays (and thereby erases) any prior stored pointer. This is the correct pointer, but this fact is not known at this time. Therefore the next CK-27 is automatically read.

CK-27 is read. Its $K_i>A$, and its $P_i<P_E$, since its $P_i$ is five and the input $P_E$ is seven. Matrix box (S2→S4) applies. The old $P_E$ is significant, and $P_i$ is stored as $P_H$, which is five. Output state S4 is provided. CK-28 through CK-29 each find $K_i>A$, and $P_i=P_H$. Hence the bottom half of matrix box (S4→S4) applies. The old $P_E$, and the old $P_H$ of five remain significant. State 4 remains.

Left-shift CK-30 has a $P_i$ of three. Its $K_i>A$, and $P_i<P_H$. Hence the upper half of matrix box (S4→S4) applies. The old $P_E$ remains significant, and a new $P_H$ of three is stored. State 4 remains.

No-shift CK-31 also has a $P_i$ of three. Its $K_i>A$, and $P_i=P_H$. The lower half of box (S4→S4) applies, and the old $P_E$ and old $P_H$ of three remain significant. State 4 remains.

Left shift CK-32 has $P_i=1$ and $K_i>A$. This ends the search according to step 332 in FIG. 19C, and the last stored pointer is R-26 which is read to the CPU as the correct pointer.

However, suppose $P_i$ were two (not in Table-D) for CK-32. Then CK-32 also has $K_i>A$ and $P_i<P_H$, but $P_i$ is not one so that the search is not ended here. The upper half of (S4→S4) applies. $P_E$ is seven and $P_H$ is now two. State 4 remains.

At CK-33 through CK-37 $P_i$ is 10, 11 and five. Hence $P_i>P_H$ since $P_H$ is two. Any comparison between K and A is ignored when $P_i>P_H$. The lower half of box (S4→S4) applies, and then the old $P_E$ & $P_H$ remain; state-4 continues until the end of index indicator of P being zero is reached. The pointer stored in pointer register 17 is R-26, which was the last and correct pointer readout to register 17.

With the nonillustrated case of CK-32 having a $P_i$ of two, an equal counter would end the search because the equal counter would then be stepped to two, and $P_i$ would then be equal to the equal counter setting. The correct R-26 is therefore stored in register 17.

What I claim is:

1. A method of generating a compressed index from a sorted sequence of uncompressed keys in a machine-accessible store, comprising machine-comparing each of said uncompressed keys with its prior key in the sorted sequence to generate an unequal signal at a highest-order unequal byte position, machine-storing only one key byte from every uncompressed key from its byte position for which said machine-comparing step generates the unequal signal, and machine-inserting said one key byte from said machine-storing step into said compressed index, whereby every compressed key in said compressed index has a single key-byte.

2. A method of generating a compressed index from a sorted sequence of uncompressed keys, comprising machine-generating a first compressed key in said index from the highest-order byte of the first uncompressed key in said index, machine-accessing said uncompressed keys in their sorted sequence, machine-pairing each uncompressed key, except a first and last, as a first uncompressed key in one pair of uncompressed keys and as the second uncompressed key in the next pair of uncompressed keys, machine-comparing like-ordered bytes in each pair of uncompressed keys in said index, beginning with the highest-ordered bytes of each pair, machine-generating a signal indicating inequality between compared bytes, machine-storing only one key byte into said compressed index from every uncompressed key at its highest-order byte position at which said machine-generating step provides an inequality signal, and machine-inhibiting any storage in said compressed index of any other byte in every one of said uncompressed keys.

3. A method of generating a compressed index as defined in claim 1, comprising machine-generating a position signal for each said one key byte in relation to its uncompressed key, and machine-storing said position signal with said one key byte in said compressed index, whereby each compressed key in said index has a fixed length.

4. A method of generating a compressed index as defined in claim 3 in which each uncompressed key has an associated pointer for addressing a data location represented by a corresponding one of said uncompressed keys, further comprising, machine-transferring the pointer for each uncompressed key into association with a corresponding compressed key in said index.

5. A method of searching for a search argument in a compressed index in which each compressed key has only a single key byte and has a position indication for said byte in relation to a corresponding uncompressed key, comprising machine-reading said position indication for each said compressed keys in sequence, machine-accessing a byte of said search argument with said position indication, machine-comparing said byte of said search argument with the single key byte of said compressed key, machine-generating a signal when said key byte and search argument byte are equal, and machine-storing a representation of a last of said compressed keys in said index for which said machine-generating step provides said signal, whereby said representation can indicate any correct compressed key in said index.

6. A method of searching for a search argument as defined in claim 5, in which said compressed index includes a pointer for each compressed key to address the location of date represented by each key, comprising machine-registering the pointer with the compressed key acted upon by said machine-storing step, whereby any pointer acted upon by said machine-registering step represents a possible correct key in said index.

7. A method of searching for a search argument in a compressed index, in which each compressed key has only a single key byte and has a position indication for said byte in relation to its uncompressed key, comprising, machine-reading said position indication with each said compressed key searched in said compressed index, machine-accessing a byte of said search argument with each said position indication, machine-comparing each said byte of said search argument with the single key byte of said compressed key, machine-signalling a signal when said machine-comparing step indicates a special relationship between said bytes, and machine-storing a special-relationship indicator when said machine-signalling step provides said signal.

8. A method of searching for a search argument as defined in claim 7, comprising machine-storing a position indication for a compressed key for which said indicator has been stored, whereby said position indication may be significant to subsequent searching for said search argument in said index.

9. A method of searching for a search argument as defined in claim 7, in which said compressed index includes a pointer for each compressed key to address the location of data represented by each key, comprising machine-storing a pointer with a last compressed key in said index for which said signal indicates equality of said bytes as said special relationship.

10. A method of searching for a search argument as defined in claim 7 in which said machine-storing step also includes, machine-storing the special-relationship indicator to represent an equality found between said bytes, whereby said indicator is significant to further searching for said search argument in said index.

11. A method of searching for a search argument as defined in claim 7, comprising machine-signalling a high or low signal as said signal in response to said compressed key having a key byte respectively greater than or less than said argument byte, and machine-storing a position indication for a compressed key providing said high or low signal from said machine-signalling step.

12. A method of searching for a search argument as defined in claim 10 comprising machine-resetting said special-relationship indicator in response to said machine-signalling step indicating the key byte in a following compressed key is less than a byte of said search argument compared by said machine-comparing step, whereby said machine-resetting step is significant to further searching for said search argument in said index.

13. A method of searching for a search argument as defined in claim 7, in which said machine-storing step stores an equal-significance indicator and an unequal-significance indicator for determining the significance of one or more subsequent compressed keys while continuing to search in said index for said search argument, and machine-controlling one or both of said significance indicators in response to said signal from said machine-signalling step.

14. A method of searching for a search argument as defined in claim 13 comprising, machine-setting each of said indicators to indicate nonsignificance prior to a search.

15. A method of searching as defined in claim 14, comprising said machine-signalling step also providing a high or low signal in response to said machine-comparing step having the key byte respectively greater than or less than the argument byte, and machine-controlling one or both of said indicators in response to said high or low signal.

16. A method of searching as defined in claim 14, said compressed index having an ascending-collating sequence, for which said machine-signalling step also provides a high signal in response to said machine-indicating step having the key byte greater than the argument byte, and machine-controlling one of said significance indicators in response to said high signal.

17. A method of searching an ascending-sequenced compressed index for a search argument as defined in claim 16, in which said machine-controlling step includes machine-resetting both of said significance indicators in response to a low signal indicating said key byte is lower than said byte of said search argument.

18. A method of searching as defined in claim 14, said compressed index having a descending-collating sequence, for which said machine-signalling step also provides a low signal in response to said machine-indicating step having the key byte less than the argument byte, and machine-controlling one of said significance indicators in response to said low signal.

19. A method of searching a descending-sequenced compressed index for a search argument as defined in claim 18, in which said machine-controlling step includes machine-resetting both of said significance indicators in response to a high signal indicating said key byte is greater than said byte of said search argument.

20. A method of searching for a search argument as defined in claim 7, comprising machine-resetting an equal indicator to a nonsignificant state for subsequent searching in said index for said search argument, and machine-resetting an unequal indicator when no position indication in any searched compressed key is currently significant to searching further in said compressed index for said search argument.

21. A method of searching as defined in claim 20 within an ascending-collated index, and upon machine-reading a next compressed key finding the equal indicator set or reset, and finding the unequal indicator reset to a nonsignificant state, comprising machine-signalling a low signal that indicates the byte of said next compressed key is less than a corresponding byte of the search argument, and machine-continuing the nonsignificant state of said unequal indicator in response to said low signal.

22. A method of searching as defined in claim 20, and upon machine-reading a next compressed key finding the equal indicator set or reset, and finding the unequal indicator reset to a nonsignificant state, comprising machine-signalling an equal signal that indicates the byte of said next compressed key is equal to a corresponding byte of the search argument, machine-setting the equal indicator to a significant state in response to said equal signal, and machine-continuing the nonsignificant state of said unequal indicator in response to said equal signal.

23. A method of searching as defined in claim 22, comprising also machine-storing a pointer associated with the compressed key providing said equal signal.

24. A method of searching as defined in claim 20 within an ascending-collated index, and upon machine-reading a next compressed key finding the equal indicator set or reset, and finding the unequal indicator reset to a nonsignificant state comprising machine-signalling a high signal that indicates the byte of said next compressed key is greater than a corresponding byte of the search argument, machine-continuing the state of said equal indicator in response to said high signal, machine-setting the unequal indicator to a significant state in response to said high signal, and also machine-storing a position indication of said next compressed key in response to said high signal for use in subsequent searching of said compressed index for said search argument.

25. A method of searching for a search argument as defined in claim 20 within an ascending-collated index, during which the equal indicator is set or reset, comprising machine-setting said unequal indicator to a significant state in response to a current key byte being greater than a corresponding byte of said search argument, also machine-storing a position indication of the current compressed key in response to said machine-setting step, and machine-reading a next compressed key in the compressed index.

26. A method of searching as defined in claim 25, and upon machine-reading the next compressed key finding the equal indicator set or reset, and finding the unequal indicator set to a significant state, comprising machine-signalling a low signal that indicates the byte of said next compressed index is less than a corresponding byte of said search argument, machine-comparing the position indication of said next compressed key with the position indication last stored by said machine-storing step, said machine-comparing step generating a high-order-shift signal when the position indication of said next compressed key has a higher order than said last registered position indication, and machine-resetting both said equal indication and said unequal indication to nonsignificant states in response to said high-order-shift signal and said low signal.

27. A method of searching as defined in claim 25, and upon machine-reading the next compressed key finding the equal indicator set or reset, and finding the unequal indicator set to a significant state, comprising machine-signalling a high signal that indicates the byte of said next compressed index is greater than a corresponding byte of said search argument, machine-comparing the position indication of said next compressed key with the position indication last stored by said machine-storing step, said machine-comparing step generating a high-order-shift signal when the position indication of said next compressed key has a higher order than said last registered position indication, machine-setting said unequal indication to a significant state in response to said high-order-shift signal and to said high signal, and machine-storing a position indication of said next compressed key in response to said high-order-shift signal and to said high signal.

28. A method of searching as defined in claim 20 within a descending-collated index, and upon machine-reading a next compressed key finding the equal indicator set or reset, and finding the unequal indicator reset to a nonsignificant state, comprising machine-signalling a high signal that indicates the byte of said next compressed key is greater than a corresponding byte of the search argument, and machine-continuing the nonsignificant state of said unequal indicator in response to said high signal.

29. A method of searching as defined in claim 20 within a descending-collated index, and upon machine-reading a next compressed key finding the equal indicator set or reset, and finding the unequal indicator reset to a nonsignificant state, comprising machine-signalling a low signal that indicates the byte of said next compressed key is less than a corresponding byte of the search argument, machine-continuing the state of said equal indicator in response to said high signal, machine-setting the unequal indicator to a significant state in response to said low signal, and machine storing a position indication of said next compressed key in response to said low signal for use in subsequent searching of said compressed index for said search argument.

30. A method of searching for a search argument as defined in claim 20 within a descending-collated index, during which the equal indicator is set or reset, comprising machine-setting said unequal indicator to a significant state in response to a current key byte being less than a corresponding byte of said search argument, machine storing the corresponding position indication of the current compressed key in response to said machine-setting step, and machine-reading a next compressed key in the compressed index.

31. A method of searching as defined in claim 30, and upon machine-reading the next compressed key finding the equal indicator set or reset, and finding the unequal indicator set to a significant state, comprising machine-signalling a high signal that indicates the byte of said next compressed index is greater than a corresponding byte of said search argument, machine-comparing the position indication of said next compressed key with the position indication last stored by said machine-storing step, said machine-comparing step generating a high-order-shift signal when the position indication of said next compressed key has a higher order than said last stored position indication, and machine-resetting both said equal indication and said unequal indication to a nonsignificant state in response to said high-order-shift signal and said high signal.

32. A method of searching as defined in claim 25 and upon machine-reading the next compressed key finding the equal indicator set or reset, and finding the unequal indicator set to a significant state, comprising machine-signalling an equal signal that indicates the byte of said next compressed index is equal to a corresponding byte of said search argument, machine-comparing a position indication of the next compressed key with the position indication last stored by said machine-storing step, said machine-comparing step generating a high-order-shift signal when the position indication of said next compressed key has a higher order than said last stored position indication, machine-setting said equal indication to a significant state, and machine-resetting said unequal indication to a nonsignificant state, in response to said high-order-shift signal and said equal signal, and machine-storing a pointer associated with said next compressed key in response to said high-order-shift signal and said equal signal.

33. A method of searching as defined in claim 30, and upon machine-reading the next compressed key finding the equal indicator set or reset, and finding the unequal indicator set to a significant state, comprising machine-signalling a low signal that indicates the byte of said next compressed index is less than a corresponding byte of said search argument, machine-comparing the position indication of the next compressed key with the position indication last stored by said machine-storing step, said machine-comparing step generating a high-order-shift signal when the position indication of said next compressed key has a higher order than the last stored position indication, machine-setting said unequal indication to a significant state in response to said high-order-shift signal and to said high signal, and machine-storing a position indication of said next compressed key in response to said high-order-shift signal and to said low signal.

34. Means for generating a compressed index from a sorted sequence of uncompressed keys in an accessible store, comprising means for comparing each of said uncompressed keys with its prior key in the sorted sequence to generate an unequal signal at a highest-order unequal byte position, means for storing only one key byte into each compressed key in response to said comparing means, said one key byte being fetched from each uncompressed key at its byte position for which said comparing means generates the unequal signal, whereby every compressed key in said compressed index has a single key-byte.

35. Means for generating a compressed index from a sorted sequence of uncompressed keys, comprising means for accessing said uncompressed keys in their sorted sequence, means for comparing like-ordered bytes in each pair of uncompressed keys provided by said accessing means beginning with the highest-ordered bytes of each pair; each uncompressed key in said sequence, except a first and last, being a second uncompressed key in one pair of uncompressed keys and a first uncompressed key in the next pair of uncompressed keys, means for generating an inequality signal indicating inequality between bytes compared by said comparing means, and means for storing the highest-order byte of the first uncompressed key, and for storing only one key byte into said compressed index from each other uncompressed key provided by said accessing means, the one key byte being at the byte position in the uncompressed key indicated by said inequality signal from said comparing means.

36. Means for generating a compressed index as defined in claim 34, further comprising means for generating a position signal for each compressed key, said generating means being actuatable by the inequality signal to indicate the position of said one key byte in its uncompressed key, and means for storing said position signal with said one key byte in said compressed index in response to actuation of said generating means, whereby each compressed key in said index has a fixed length.

37. Means for generating a compressed index as defined in claim 36 in which each uncompressed key has an associated pointer for addressing a data location represented by a corresponding one of said uncompressed keys, further comprising, means for transferring the pointer for each uncompressed key into association with a corresponding compressed key in said index.

38. Means for searching for a search argument in a compressed index in which each compressed key has only a single key byte and has a position indication for said byte in relation to a corresponding uncompressed key, comprising, means for reading said position indication for each said compressed keys in sequence, means for accessing a byte of said search argument with said position indication, means for comparing said byte of said search argument with the single key byte of said compressed key, means for generating a signal when said key byte and search argument byte are equal, and means for storing a representation of a last of said compressed keys in said index for which said generating means provides said signal, whereby said representation can indicate any correct compressed key in said index.

39. Means for searching for a search argument as defined in claim 38, in which said compressed index includes a pointer for each compressed key to address the location of data represented by each key, comprising means for registering the pointer with the compressed key having a representation stored by said storing means, whereby any pointer acted upon by said registering means represents a possible correct key in said index.

40. Means for searching for a search argument in a compressed index, in which each compressed key has only a single key byte and has a position indication for said byte in relation to its uncompressed key, comprising, means for reading said position indication and the single key byte with each said compressed key in sequence, means for accessing a byte of said search argument with said position indication, means for comparing said byte of said search argument with the single key byte of said compressed key, means for signalling a signal when said comparing means indicates a special relationship between said bytes, and means for registering in a storage area a bit representation for any special relationship signalled by said signalling means.

41. Means for searching for a search argument as defined in claim 40, comprising said registering means also storing the position indication for any compressed key for which a certain type of said special representation has been signalled by said signalling means, whereby said position indication may be significant to subsequent searching for said search argument in said index.

42. Means for searching for a search argument as defined in claim 40, in which said compressed index includes a pointer for each compressed key to address the location of data represented by each key, comprising means for storing the pointer with a last compressed key in said index for which said signal is an equal signal.

43. Means for searching for a search argument as defined in claim 40 in which said registering means also includes, means for registering a significance indication in response to said equal signal, whereby said significance indication is significant to further searching for said search argument in said index.

44. Means for searching for a search argument as defined in claim 40, comprising said signalling means providing a high or low signal as said signal in response to said compressed key having a key byte respectively greater than or less than said argument byte, and said registering means storing a position indication for a significant compressed key providing said high signal for an ascending index, or providing said low signal for a descending index.

45. Means for searching for a search argument as defined in claim 43, comprising means for setting an unequal indication to a nonsignificant state in response to said equal signal, whereby said nonsignificant state may be used in further searching for said search argument in said index.

46. Means for searching for a search argument as defined in claim 40, comprising
said registering means storing an equal-significance indicator and an unequal-significance indicator for determining the significance of one or more subsequent compressed keys while continuing to search in said index for said search argument,
and means for controlling one or both of said significance indicators in response to said signal from said signalling means.

47. Means for searching for a search argument as defined in claim 46 comprising,
means for setting each of said indicators to indicate nonsignificance prior to a search.

48. Means for searching as defined in claim 47, comprising
said signalling means also providing a high or low signal in response to said comparing means having the key byte respectively greater than or less than the argument byte,
and means for controlling one or both of said significance indicators in response to said high or low signal.

49. Means for searching as defined in claim 47, said compressed index having an ascending-collating sequence, for which
said signalling means also provides a high signal in response to said indicating means having the key byte greater than the argument byte,
and means for controlling one of said significance indicators in response to said high signal.

50. Means for searching an ascending-sequenced compressed index for a search argument as defined in claim 49, in which said controlling means includes
means for resetting both of said significance indicators in response to a low signal indicating said key byte is lower than said byte of said search argument.

51. Means for searching as defined in claim 47, said compressed index having a descending-collating sequence, for which
said signalling means also provides a low signal in response to said comparing means having the key byte less than the argument byte,
and means for controlling one of said significance indicators in response to said low signal.

52. Means for searching a descending-sequenced compressed index for a search argument as defined in claim 51, in which said controlling means includes
means for resetting both of said significance indicators in response to a high signal indicating said key byte is greater than said byte of said search argument.

53. Means for searching for a search argument as defined in claim 40, comprising
said registering means including an equal indicator, and an unequal indicator,
means for resetting the equal indicator to a nonsignificant state in response to said signalling means indicating one type of special relationship,
means for resetting the unequal indicator when no position indication in any searched compressed key is currently significant in response to said signalling means indicating a second type of special relationship,
means for setting the equal indicator to a significant state in response to said signalling means indicating a third special relationship, and
means for setting the unequal indicator to a significant state in response to said signalling means indicating a fourth special relationship,
whereby the states of said indicators are used for further searching for a search argument in said compressed index.

54. Means for searching as defined in claim 53 within an ascending-collated index, and upon said reading means providing a next compressed key, the state of the equal indicator being set or reset, and the state of the unequal indicator being reset, to a nonsignificant state, comprising
said signalling means providing a low signal that indicates the key byte from said reading means for said next compressed key is less than a corresponding byte of the search argument,
whereby the nonsignificant state of said unequal indicator is continued after said low signal from said signalling means.

55. Means for searching as defined in claim 53, and upon said reading means providing a next compressed key, the state of the equal indicator being set or reset, and the state of the unequal indicator being reset to a nonsignificant state, comprising
said signalling means providing an equal signal that indicates the key byte from said reading means for said next compressed key is equal to a corresponding byte of the search argument,
said setting means for the equal indicator being actuated to set it to a significant state in response to said equal signal,
and means for continuing the nonsignificant state of said unequal indicator in response to said equal signal from said signalling means.

56. Means for searching as defined in claim 55, comprising
means for registering a pointer associated with the compressed key providing said equal signal.

57. Means for searching as defined in claim 53 within an ascending-collated index, and upon said reading means providing a next compressed key, the state of the equal indicator being set or reset, and the state of the unequal indicator being reset to a nonsignificant state, comprising
said signalling means providing a high signal that indicates the key byte from said reading means for said next compressed key is greater than a corresponding byte of the search argument,
means for continuing the state of said equal indicator in response to said high signal,
said setting means for the unequal indicator being actuated to set it to a significant state in response to said high signal,
and said registering means being actuated to register the position indication of said next compressed key in response to said high signal, for use in subsequent searching of said compressed index for said search argument.

58. Means for searching for a search argument as defined in claim 53 within an ascending-collated index, during which the equal indicator is set or reset, comprising
said setting means for the unequal indicator being actuated to set it to a significant state in response to a current key byte being greater than a corresponding byte of said search argument,
said registering means being actuated to register the position indication of the current compressed key in response to said setting of said unequal indicator,
and said reading means providing a next compressed key in the compressed index.

59. Means for searching as defined in claim 58, and upon said reading means providing a next compressed key, the state of the equal indicator being set or reset, and the state of the unequal indicator being set to a significant state, comprising
said signalling means providing a low signal that indicates the key byte from said reading means for said next compressed index is less than a corresponding byte of said search argument,
means for also comparing the position indication provided by said reading means from said next compressed key with the position indication last registered by said registering means, said comparing means generating a left shift signal when the position indication of said next compressed key has a higher order than said last registered position indication,
and said resetting means for the equal indicator and for the unequal indicator being actuated to reset said indicators to nonsignificant states in response to said left-shift signal and said low signal.

60. Means for searching as defined in claim 58, and upon said reading means providing a next compressed key, the state of equal indicator being set or reset, and the state of the unequal indicator being set to a significant state, comprising said signalling means providing a high signal that indicates the key byte provided by said reading means for said next compressed index is greater than a corresponding byte of said search argument, means for also comparing the position indication provided by said reading means from said next compressed key with the position indication last registered by said registering means, said also comparing means generating a left-shift signal when the position indication of said next compressed key has a higher order than said last registered position indication, said setting means for the unequal indicator being actuated to set it to a significant state in response to said left-shift signal and to said high signal, and said registering means being actuated to register the position indication of said next compressed key in response to said left-shift signal and to said high signal.

61. Means for searching as defined in claim 53 within a descending-collated index, and upon said reading means providing a next compressed key, the state of the equal indicator being set or reset, and the state of the unequal indicator being reset to a nonsignificant state, comprising said signalling means providing a high signal that indicates the key byte provided by said reading means from said next compressed key is greater than a corresponding byte of the search argument, whereby the states of said indicators is continued in response to said high signal.

62. Means for searching as defined in claim 53 within a descending-collated index, and upon said reading means providing a next compressed key, the state of the equal indicator being set or reset, and the state of the unequal indicator being reset to a nonsignificant state, comprising said signalling means providing a low signal that indicates the key byte provided by said reading means from said next compressed key is less than a corresponding byte of the search argument, said setting means for the unequal indicator being actuated to set it to a significant state in response to said low signal, and said registering means being actuated to register the position indication of said next compressed key in response to said low signal, whereby the state of said equal indicator is continued after said next compressed key with the existing states of said indicators being used in subsequent searching of said compressed index for said search argument.

63. Means for searching for a search argument as defined in claim 53 within a descending-collated index, during which the equal indicator is set or reset, comprising said setting means for the unequal indicator being actuated to set it to a significant state in response to a current key byte from said reading means being less than a corresponding byte of said search argument, said registering means being actuated to register the position indication of the current compressed key in response to said setting means, and said reading means providing a next compressed key in the compressed index.

64. Means for searching as defined in claim 63, and upon said reading means providing a next compressed key, the state of the equal indicator being set or reset, and the state of the unequal indicator being set to a significant state, comprising said signalling means providing a high signal that indicates the key from said reading means for said next compressed index is greater than a corresponding byte of said search argument, means for also comparing the position indication provided by said reading means for said next compressed key with the position indication last registered by said registering means, said comparing means generating a left-shift signal when the position indication of said next compressed key has a higher order than said last registered position indication, and said resetting means for the equal indicator and for the unequal indicator being actuated to set them to a nonsignificant state in response to said left-shift signal and said high signal.

65. Means for searching as defined in claim 58, and upon said reading means providing a next compressed key, the state of the equal indicator being set or reset, and the state of the unequal indicator being set to a significant state, comprising, said signalling means providing an equal signal that indicates the key byte provided by said reading means for said next compressed index is equal to a corresponding byte of said search argument, means for also comparing a position indication provided by said reading means from the next compressed key with the position indication last registered by said registering means, said also comparing means generating a left-shift signal when the position indication of said next compressed key has a higher order than the last registered position indication, said resetting means for the unequal indicator being actuated to a nonsignificant state in response to said left-shift signal and to said high signal, and means for storing a pointer provided by said reading means for said next compressed key in response to said left-shift signal and to said equal signal.

66. Means for searching as defined in claim 63, and upon said reading means providing the next compressed key, the state of the equal indicator being set or reset, and the state of the unequal indicator being set to a significant state, comprising said signalling means providing a low signal that indicates the key byte provided by said reading means from said next compressed index is less than a corresponding byte of said search argument, means for also comparing the position indication provided by said reading means for the next compressed key with the position indication last registered by said registering means, said comparing means generating a left-shift signal when the position indication of said next compressed key has a higher order than the last registered position indication, and said registering means being actuated to register the position indication of said next compressed key in response to said left-shift signal and to said low signal, whereby the setting of said unequal indicator is continued.